US010852823B2

(12) United States Patent
Ortiz Egea et al.

(10) Patent No.: US 10,852,823 B2
(45) Date of Patent: Dec. 1, 2020

(54) USER-SPECIFIC EYE TRACKING CALIBRATION FOR NEAR-EYE-DISPLAY (NED) DEVICES

(71) Applicant: Microsoft Technology Licensing, LLC, Redmond, WA (US)

(72) Inventors: Sergio Ortiz Egea, San Jose, CA (US); Jian Feng Gao, Redmond, WA (US); Alfonsus D. Lunardhi, San Ramon, CA (US); Venkata Satya Raghavendra Bulusu, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,654

(22) Filed: May 16, 2019

(65) Prior Publication Data

US 2020/0125166 A1    Apr. 23, 2020

Related U.S. Application Data

(63) Continuation-in-part of application No. 16/168,319, filed on Oct. 23, 2018.

(51) Int. Cl.
*G06F 3/01* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/0172* (2013.01); *G02B 2027/0178* (2013.01)

(58) Field of Classification Search
CPC ............ G02B 27/0093; G02B 27/0172; G02B 27/0179; G02B 2027/014;
(Continued)

(56) References Cited

U.S. PATENT DOCUMENTS 7,091,928 B2   8/2006 Rajasingham
9,075,453 B2   7/2015 Bhaskar et al.
(Continued)

FOREIGN PATENT DOCUMENTS

EP    2893388 A1    7/2015
WO    2013168171 A1    11/2013
(Continued)

OTHER PUBLICATIONS

"International Search Report and Written Opinion Issued in PCT Application No. PCT/US19/054911", dated Jan. 31, 2020, 10 Pages.
(Continued)

*Primary Examiner* — Lisa S Landis
(74) *Attorney, Agent, or Firm* — Newport IP, LLC; Mike R. Cicero

(57) ABSTRACT

Technologies for performing user-specific calibration of eye tracking systems for Near-Eye-Display (NED) devices. The NED device may sequentially present different virtual stimuli to a user while concurrently capturing instances of eye tracking data. The eye tracking data reveals calibration ellipse centers that uniquely correspond to individual virtual stimuli. The calibration ellipse centers may be used define a polygon grid in association with a sensor plane. The resulting polygon grid is used during operation to interpolate the real-time gaze direction of the user. For example, a real-time instance of eye tracking data may be analyzed to determine which particular polygon of the polygon grid a real-time ellipse center falls within. Then, distances between the real-time ellipse center and the vertices of the particular polygon may be determined. A proportionality factor is then determined based on these distances and is used to interpolate the real-time eye gaze of the user.

20 Claims, 17 Drawing Sheets

(58) Field of Classification Search
CPC .... G02B 2027/0178; G02B 2027/0187; G06F 3/011; G06F 3/012; G06F 3/013
See application file for complete search history.

(56) References Cited

U.S. PATENT DOCUMENTS

| | | |
|---|---|---|
| 9,299,183 B2 | 3/2016 | Vesely |
| 9,335,547 B2 | 5/2016 | Takano et al. |
| 9,507,426 B2 | 11/2016 | Raffle |
| 9,514,538 B2 | 12/2016 | Ebisawa |
| 9,766,463 B2 | 9/2017 | Border et al. |
| 9,952,665 B2 | 4/2018 | Di Censo et al. |
| 10,067,561 B2 | 9/2018 | San Agustin Lopez |
| 2006/0250322 A1 | 11/2006 | Hall et al. |
| 2013/0050432 A1 | 2/2013 | Perez et al. |
| 2013/0050833 A1 | 2/2013 | Lewis et al. |
| 2013/0083003 A1* | 4/2013 | Perez .......... A63B 24/0062 345/419 |
| 2013/0241805 A1 | 9/2013 | Gomez |
| 2014/0285404 A1 | 9/2014 | Takano et al. |
| 2015/0097772 A1 | 4/2015 | Starner |
| 2015/0262424 A1 | 9/2015 | Tabaka et al. |
| 2015/0301599 A1 | 10/2015 | Miller |
| 2015/0309568 A1 | 10/2015 | Miki |
| 2016/0025971 A1 | 1/2016 | Crow et al. |
| 2016/0203359 A1 | 7/2016 | Von Und Zu Liechtenstein |
| 2016/0225153 A1 | 8/2016 | Kim |
| 2017/0069135 A1 | 3/2017 | Komaki et al. |
| 2017/0108697 A1 | 4/2017 | El-ghoroury et al. |
| 2017/0123492 A1 | 5/2017 | Marggraff et al. |
| 2018/0300952 A1 | 10/2018 | Evans et al. |
| 2018/0350145 A1 | 12/2018 | Byl et al. |
| 2020/0121183 A1 | 4/2020 | Ortiz egea et al. |

FOREIGN PATENT DOCUMENTS

| | | |
|---|---|---|
| WO | 2014205422 A2 | 12/2014 |
| WO | 2015013022 A1 | 1/2015 |

OTHER PUBLICATIONS

"International Search Report and Written Opinion Issued in PCT Application No. PCT/US19/054912", dated Feb. 6, 2020, 11 Pages.

"International Search Report and Written Opinion Issued in PCT Application No. PCT/US19/055279", dated Jan. 28, 2020, 12 Pages.

"International Search Report and Written Opinion Issued in PCT Application No. PCT/US19/055749", dated Feb. 4, 2020, 12 Pages.

"Non Final Office Action Issued in U.S. Appl. No. 16/168,319", dated Oct. 17, 2019, 11 Pages.

"International Search Report and Written Opinion Issued in PCT Application No. PCT/US2019/055280", dated Feb. 27, 2020, 10 Pages.

"Non Final Office Action Issued in U.S. Appl. No. 16/383,474", dated Apr. 9, 2020, 15 Pages.

"Non Final Office Action Issued in U.S. Appl. No. 16/383,498", dated Apr. 15, 2020, 20 Pages.

"Non Final Office Action Issued in US Appl. No. 16/414,637" dated Sep. 17, 2020, 14 pages.

\* cited by examiner

● = Targeted Focal Point
■ = Wondering Focal Point

USER-SPECIFIC EYE TRACKING CALIBRATION FOR NEAR-EYE-DISPLAY (NED) DEVICES

PRIORITY APPLICATION

This U.S. non-provisional application is a continuation in part application that claims benefit of and priority to U.S. Non-Provisional application Ser. No. 16/168,319, filed Oct. 23, 2018, entitled EYE TRACKING SYSTEMS AND METHODS FOR NEAR-EYE-DISPLAY (NED) DEVICES, the entire contents of which are incorporated herein by reference.

BACKGROUND

Near-Eye-Display (NED) systems superimpose computer-generated images ("CG images") over a user's view of a real-world environment. For example, a NED system may generate composite views to enable a user to visually perceive a CG image superimposed over a physical object that exists within the real-world environment. In some instances, the NED system may track a depth at which the user is focusing within the real-world environment. One reason for tracking the user's focal depth (e.g., accommodation plane) is because the user may experience motion sickness or vertigo if CG images are rendered at a depth that is different (i.e., closer to/farther from the user) than that which the user is focusing. For this reason, a user's experience may be highly dependent on the NED system accurately tracking the user's eye movements. This is but one of many aspects of how the accuracy of eye tracking impacts a user's experience with a NED system.

Some conventional eye tracking systems may undergo a calibration process whereby geometric characteristics of a specific user's eyes are accounted for. During such a calibration process, a particular user may be prompted to sequentially direct their focus onto various known points on a display while images of the particular user's eyes are captured. An anatomical model of the particular user's eyes may be refined based on these images to more accurately reflect the true geometric characteristics of the particular user's eyes. Following the calibration process, the refined anatomical model may be used in real-time to calculate the user's gaze during real-time operation of the eye tracking system. Unfortunately, these calculations are computationally intensive and negatively impact computing resource consumption on compact computing systems such as, for example, NED systems.

It is with respect to these and other considerations that the disclosure made herein is presented.

SUMMARY

Technologies described herein provide techniques for performing user-specific calibration of eye tracking systems for Near-Eye-Display (NED) devices. Generally described, a NED device may sequentially present a plurality of virtual stimuli to a user in a random or pseudo-random fashion. While presenting each individual stimulus, the NED device deploys an eye tracking system to capture instances of eye tracking data (e.g., images of the eyes) in association with each individual virtual stimulus. The individual instances of eye tracking data may be analyzed to identify calibration ellipse centers that uniquely correspond to individual ones of the plurality of virtual stimuli. These calibration ellipse centers may be represented in a sensor plane and may be used define a polygon grid in association with the sensor plane. As a specific example, a grid of triangles may be formed in the sensor plane by interconnecting individual calibration ellipse centers that are represented in the sensor plane. The resulting polygon grid may then be used during operation to interpolate the real-time gaze direction of the user. More particularly, the real-time gaze direction of the user may be interpolated based on a location of a real-time ellipse center within the polygon grid that is formed by interconnecting the calibration ellipse centers. Continuing with the example in which the polygon grid is a grid of triangles, a real-time instance of eye tracking data may be analyzed to determine which particular triangle a real-time ellipse center falls within. Then, distances between the real-time ellipse center and the three calibration ellipse centers that form the particular triangle may be determined. Finally, a proportionality factor is determined based on these distances and then used to interpolate the real-time eye gaze (e.g., optical axis) of the user.

In an exemplary implementation of performing user-specific eye tracking calibration, a Near-Eye-Display (NED) device includes a display that is positioned within a user's field of view when the NED device is being properly worn by the user. For example, the NED device may include a transparent display that is positioned slightly forward of the user's eyes. The NED device further includes an eye tracking system having one or more sensors that generate eye tracking data associated with one or both of the user's eyes. In some embodiments, the individual sensors have corresponding sensor planes that are angularly skewed with respect to Iris-Pupil Plane(s) of the user's eye(s). Thus, based on the eye tracking data, the eye tracking system may determine ellipse parameters for ellipses that result from these sensor planes being angularly skewed from the Iris-Pupil Planes. In particular, the angular skew of the sensor plane with respect to the Iris-Pupil Plane results in circular features of the eyes (e.g., the pupil and/or iris) appearing elliptical in shape. The ellipse parameters may indicate the center points for the ellipses as described in more detail below.

To perform a user-specific eye tracking calibration, the NED device may sequentially present a plurality of virtual stimuli to a user in a random or pseudo-random fashion. In this way, the user's focus may be drawn from one virtual stimulus to another virtual stimulus, and so on. The plurality of virtual stimuli may be arranged according to a predetermined pattern such as, for example, an ordered grid that includes rows and columns of virtual stimuli. The NED device may present individual ones of the virtual stimuli while simultaneously capturing instances of eye tracking data (e.g., images of the eyes). The eye tracking data be indicative of one or more center points for elliptical images of the user's pupils and/or irises—each center point uniquely corresponding to an individual virtual stimulus. As described in detail below, these center points may be used to define and/or form a polygon grid by interconnecting the center points as they are represented within the sensor planes of each sensor. Furthermore, the resulting polygon grids may be usable to interpolate a user's eye gaze in near real-time when the NED device is being used in real-time operation (e.g., following the calibration process). In a specific implementation, the polygon grid is a grid of triangles from which a user's gaze may be calculated using a Delaunay decomposition and by estimating barycentric coordinates.

In some embodiments, the polygon grid is formed by interconnecting averaged values of numerous calibration ellipse centers that uniquely correspond to individual ones of the plurality of virtual stimuli. The reasoning for such averaging is because as an individual one of the virtual stimuli is presented, the user's focus will move rapidly around this individual virtual stimulus due to saccadic movements which naturally occur as the user collects information about the scene. Thus, multiple instances (e.g., frames) of eye tracking data may be collected in association with each individual virtual stimulus—each instance of eye tracking data having a different ellipse center. As a specific but non-limiting example, if the user's eyes make three saccadic movements per second and the NED device monitors these movements for four seconds while the user focuses on an individual virtual stimulus, then the NED device may collect twelve unique instances of eye tracking data in association with this individual virtual stimulus. In this specific example, these twelve unique instances of eye tracking data may be averaged to determine an average or nominal calibration ellipse center in association with the individual virtual stimulus. Then, this average or nominal calibration ellipse center may be used to form a polygon grid that is specific to the user.

Following the user-specific eye tracking calibration, the NED device may utilize the eye tracking system to monitor movements of the user's eyes during real-time operation. Similar to the eye tracking data that is captured during calibration, the eye tracking data that is captured during real-time operation may be indicative of one or more center points for elliptical images of the user's pupils and/or irises. However, these so called "real-time" ellipse centers will in most cases be located somewhere in between groupings of the "calibration" ellipse centers. This is of course because the user is no longer being presented with virtual stimuli but is rather focusing at various objects of interest that exist within a real-world environment. Thus, the "real-time" ellipse centers that are identified when eye tracking is being performed during actual use of the NED device (e.g., following the calibration phase when virtual stimulus are presented) are located within the boundaries of individual polygons of the user-specific polygon grid. For example, a "real-time" ellipse center might fall within an individual triangle that is formed by interconnecting a group of three "calibration" ellipse centers.

To determine the user's real time gaze direction (e.g., in terms of optical axis and/or visual axis), the NED device may determine which particular polygon of the polygon grid a current "real-time" ellipse center falls within. For example, if the polygon grid is a grid of triangles, then a real-time instance of eye tracking data (e.g., a particular frame or image of an eye) may be analyzed to determine which particular triangle a real-time ellipse center currently falls within. Once this triangle has been determined, the Euclidean distance between the "real-time" ellipse center to each of the calibration ellipse centers that form the triangle may be determined. Then, proportionality factors $\alpha_R$ may be calculated with respect to each of the calibration ellipse centers that form the polygon grid bounding the real-time ellipse center. For example, in the example where the polygon grid is a grid of triangles, then three proportionality factors ($\alpha_A$, $\alpha_B$, and $\alpha_C$) may calculated based on the real-time ellipse center. These proportionality factors may then be used as weighted sums to calculate the user's real time gaze direction.

It should be appreciated that any reference to "first," "second," etc. items and/or abstract concepts within the Summary and/or Detailed Description is not intended to and should not be construed to necessarily correspond to any reference of "first," "second," etc. elements of the claims. In particular, within the Summary and/or Detailed Description, items and/or abstract concepts such as, for example, three-dimensional (3D) propagations and/or circular features of eyes and/or sensor entrance pupils may be distinguished by numerical designations without such designations corresponding to the claims or even other paragraphs of the Summary and/or Detailed Description. For example, any designation of a "first 3D propagation" and "second 3D propagation" of the eye tracking system within any specific paragraph of this the Summary and/or Detailed Description is used solely to distinguish two different 3D propagations of the eye tracking system within that specific paragraph—not any other paragraph and particularly not the claims.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

The following Detailed Description describes technologies for performing user-specific calibration of eye tracking systems for compact electronic devices such as, for example, Near-Eye-Display (NED) devices, laptop computers, etc. In some implementations, a compact electronic device may sequentially present a plurality of virtual stimuli to a user in a random or pseudo-random fashion. While presenting each individual stimulus, an eye tracking system captures instances of eye tracking data (e.g., images of the eyes) in association with each individual virtual stimulus. The eye tracking data reveals one or more calibration ellipse centers that uniquely correspond to individual ones of the plurality of virtual stimuli. These calibration ellipse centers may be represented in a sensor plane and may be used define a polygon grid in association with the sensor plane. As a specific example, a grid of triangles may be formed in the sensor plane by interconnecting individual calibration ellipse centers that are represented in the sensor plane. The resulting polygon grid may then be used during operation to interpolate the real-time gaze direction of the user. Continuing with the example in which the polygon grid is a grid of triangles, a real-time instance of eye tracking data may be analyzed to determine which particular triangle a real-time ellipse center falls within. Then, distances between the real-time ellipse center and the three calibration ellipse centers that form the particular triangle may be determined. Finally, a proportionality factor is determined based on these distances and then used to interpolate the real-time eye gaze (e.g., optical axis) of the user.

Aspects of the techniques described herein are primarily described in the context of the sensors being cameras that contain one or more lenses that define an entrance pupil that is disposed in front of an image-sensor (e.g., a CMOS sensor). In such embodiments, the image sensor may generate eye tracking data in the form of pixel data that defines images of the user's eyes. While the disclosed techniques are not necessarily limited to using cameras, an appreciation of various aspects of the invention is best gained through a discussion of example in such a context. However, any type of sensor that is suitable for observing a shape and/or orientation of the iris and/or pupil of the user's eye shall be considered variations of the techniques described herein. For example, it will be appreciated that various forms of lenses sensors may also be suitable for implementing the techniques described herein.

Figure 1:
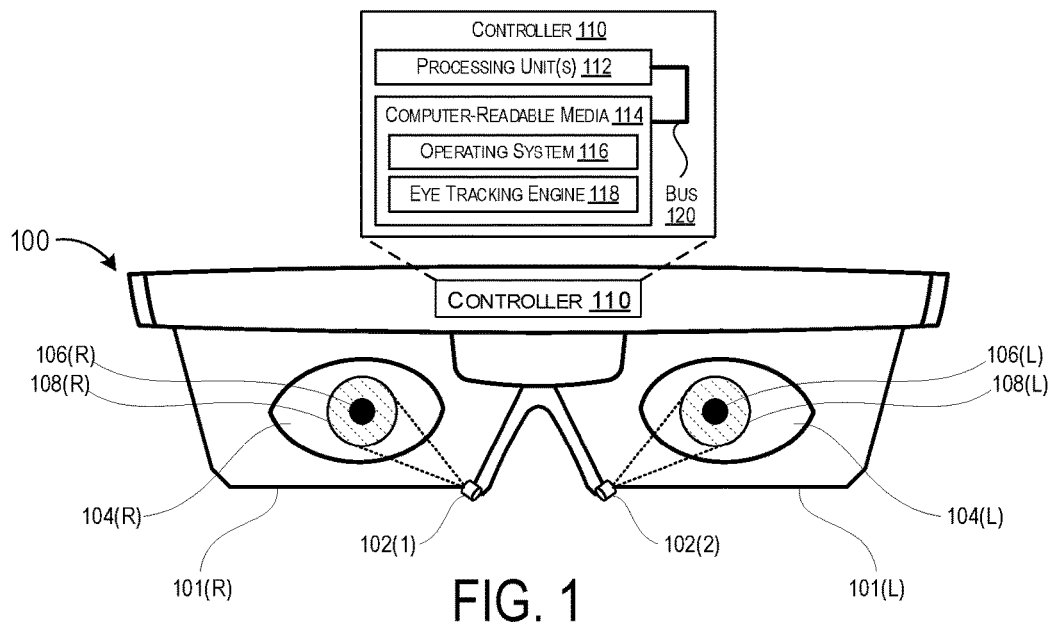
FIG. 1 illustrates an exemplary hardware layout for a Near-Eye-Display (NED) device that is configured to implement the methods described herein.

Turning now to FIG. 1, illustrated is an exemplary hardware layout for a Near-Eye-Display (NED) device 100 that is configured to implement the methods described herein. In the exemplary hardware layout the NED device 100 includes a pair of sensors 102 that are each directed toward a corresponding eye 104 of a user. More specifically, the illustrated NED device 100 includes a first sensor 102(1) that is angularly offset from and directed toward a right eye 104(R) and also a second sensor 102(1) that is angularly offset from and directed toward a left eye 104(L). The right eye 104(R) includes a corresponding pupil 106(R) and a corresponding iris 108(R). The left eye 104(L) includes a corresponding pupil 106(L) and a corresponding iris 108(L). The sensors 102 can be in any suitable form such as, for example, a non-contact sensor configured to use optical-based tracking (e.g. video camera based and/or some other specially designed optical-sensor-based eye tracking technique) to monitor the one or more physical characteristics of the user's eyes. Exemplary physical characteristics include, but are not limited to, pupil size, a rate of change of pupil size, gaze direction, and/or a rate of change to a gaze direction.

FIG. 1 is illustrated from a perspective that is directly in front of the optical axes of the eyes 104 so that the pupils 106 and irises 108 appear perfectly circular. It will be appreciated by one skilled in the art that in humans (and many other vertebrates for that matter) the pupils 106 and irises 108 of the eyes 104 are almost perfect circles. Therefore, in various calculations described below, the pupils 106 and/or irises 108 are mathematically modeled as and/or presumed to be perfectly circular in shape. From the perspective of the individual sensors 102, however, the pupils 106 and irises 108 of the eyes 104 appear to be elliptical as described herein. This is because the sensors 102 are angularly offset from the eyes 104 in the sense that the optical axis of each individual sensor 102 is not parallel to the optical axis of the eye 104 it is tracking. The position of the sensors 102 shown in FIG. 1 is for illustrative purposes only. It will be appreciated that the techniques described herein can be performed with the sensors 102 being located in a variety of positions with respect to the eyes. As a specific but nonlimiting example, the sensors could be embedded within a lens or other substrate directly in front of the eyes.

The NED device 100 may be configured to render computer generated images (CGIs) in front of a user's eye(s). For example, the NED device 1404 can be used for augmented reality (AR) and/or virtual reality (VR) applications. In implementations where the NED device 100 is an AR-type Head Mounted Device (HMD) device, a display element 101 may protrude into the user's field of view. An exemplary type of display component may be a transparent waveguide display that enables the user to see concurrently both the real-world environment surrounding him or her as well as AR content generated by the display element 101. In the illustrated embodiment, the NED device includes a right display element 102(R) that generates images in front of the user's right eye and also a left display element 102(L) that generates images in front of the user's left eye. The one or more display elements 101 may be deployed to present virtual stimuli to the user to perform the calibration techniques described herein.

In the illustrated embodiment, the NED device 100 further includes a controller 110 that is configured to implement the various operations of the methods described herein. The controller 110 may be communicatively coupled to the sensors 102 to receive eye tracking data that is generated by the sensors 102 in association with the circular features of the eyes. The controller 110 may further be communicatively coupled to other componentry of the NED device 100. The controller 110 includes one or more logic devices and one or more computer memory devices storing instructions executable by the logic device(s) to deploy functionalities described herein with relation to the NED device 100. The controller 116 can comprise one or more processing units 112, one or more computer-readable media 114 for storing an operating system and data such as, for example, eye tracking data, visual axis offset data, application data, etc. The computer-readable media 114 may further include an eye tracking engine (e.g., module) configured to receive the eye tracking data from the sensor 102 and, based thereon, determine one or more physical characteristics of the user's eyes using the methods and techniques described herein. The components of the NED device 100 are operatively connected, for example, via a bus 120, which can include one or more of a system bus, a data bus, an address bus, a PCI bus, a Mini-PCI bus, and any variety of local, peripheral, and/or independent buses.

The processing unit(s) 112, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 114, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The NED device 100 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

Figure 2:
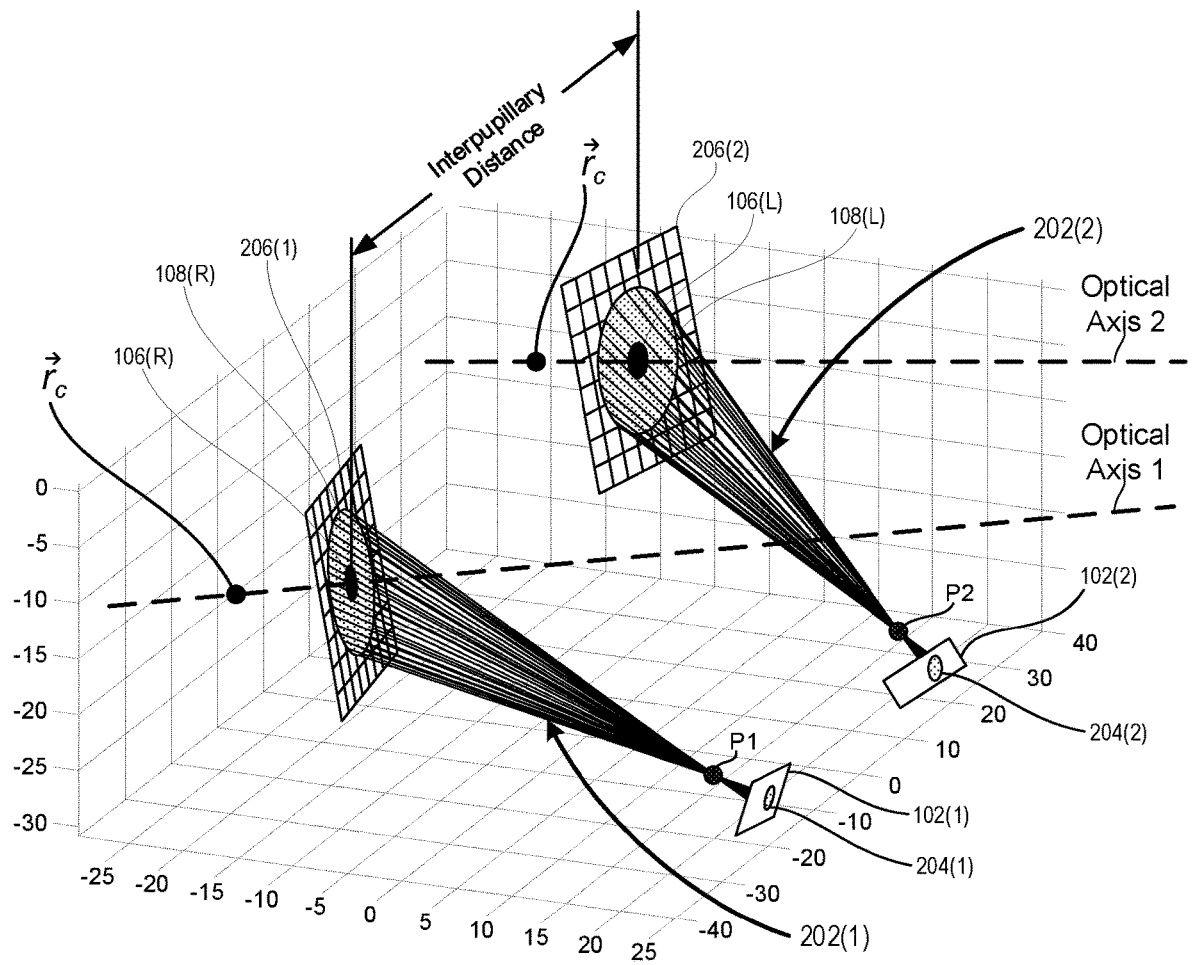
FIG. 2 illustrates a pair of three-dimensional (3D) propagations that extend from ellipses that result from circular features of user's eyes being projected into the sensors.

Turning now to FIG. 2, illustrated is a pair of three-dimensional (3D) propagations 202 that extend from ellipses 204 that result from circular features (e.g., pupils 106 and/or irises 108) of user's eyes 104 being projected into the sensors 102. As illustrated, a first 3D propagation 202(1) extends from a first ellipse 204(1), which is detected at the first sensor 102(1), through a first point P1. As further illustrated, a second 3D propagation 202(2) extends from a second ellipse 204(2), which is detected at the second sensor 102(2), through a second point P2. Each of the 3D propagations 202 extend toward a corresponding Iris-Pupil plane 206 that is angularly offset with respect to the sensors 102. The angularly offset nature of the Iris-Pupil planes 206 results in the pupils 106 and irises 108 appearing elliptical from the perspectives of the sensors 102.

As illustrated, each of the individual 3D propagations 202 may include a series of lines that extend from a perimeter of a corresponding individual ellipse 204 through a corresponding predetermined point and, ultimately, to the perimeter of a circular feature (e.g., pupil 106 or iris 108) that resides within a corresponding Iris-Pupil plane 206. The predetermined points (e.g., P1 and P2) may correspond to specific points in space that are measurable in relation to corresponding sensors 102. For example, the first predetermined point P1 may correspond to a center of an entrance pupil of the first sensor 102(1) whereas the second predetermined point P2 may correspond to a center of an entrance pupil of the second sensor 102(2). Thus, it can be appreciated that P1 may correspond to a point in space at which light rays cross prior to forming an image within the first sensor 102(1) and that P2 may correspond to a point in space at which light rays cross prior to forming an image within the second sensor 102(2).

As described in more detail below, these 3D propagations 202 may be used to determine pupil orientation parameters that define various characteristics of the user's pupil(s) 106. For example, it can be appreciated that the 3D propagations 202 can be mathematically modeled as elliptical cones. This is because individual ones of the 3D propagations 202 originate at a corresponding ellipse 204 and pass through a singular point. It can further be appreciated that a cross-section of an elliptical cone will be circular in shape if that cross-section is taken at a specific orientation. Thus, by using the mathematical assumption that the pupils 106 and irises 108 are circular in shape, the 3D propagations 202 may enable a determination of the specific orientation of the Iris-Pupil planes 206. Additionally, as described in more detail below, performing various error minimization techniques of the 3D propagations with respect to an ocular rotation model may further enable a determination of the center points of the pupils 106. It can be appreciated that once the location in space of the center point of a pupil 106 and an orientation of an Iris-Pupil plane 206 is known for a particular eye, the optical axis (illustrated as dashed lines for each eye) for that particular eye is also known.

Figure 3:
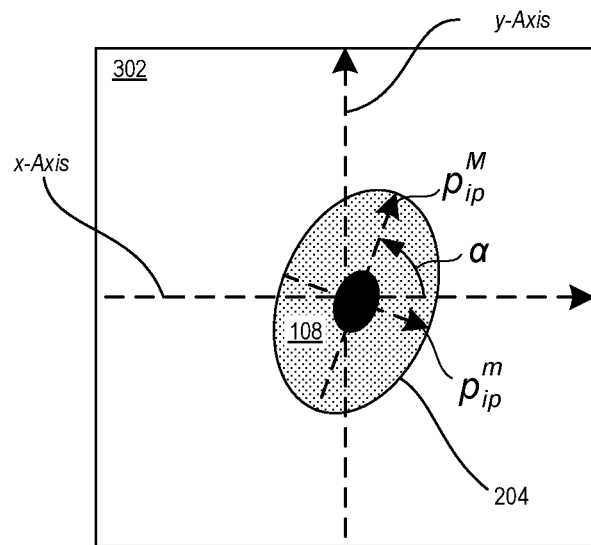
FIG. 3 illustrates in an exemplary ellipse that is being projected onto a sensor plane within a sensor that is angularly skewed with respect to the Iris-Pupil plane (not shown in FIG. 3) so that circular features on the Iris-Pupil plane appear elliptical on the sensor plane.

Turning now to FIG. 3, illustrated in an exemplary ellipse 204 that is projected from a circular feature of an eye 104 (e.g., an Iris 108) onto a sensor plane 302 of a sensor 102. The sensor plane 302 may correspond to a substantially planar surface within the sensor 102 that is angularly skewed with respect to a corresponding Iris-Pupil plane 206 (not shown in FIG. 3) so that circular features on the Iris-Pupil plane appear elliptical on the sensor plane 302. In some embodiments, the sensors 102 may be image sensors such as, for example, complementary metal oxide semiconductor (CMOS) sensors and/or charge-coupled device (CCD) sensors. In such embodiments, the sensors 102 may generate eye tracking data in the form of pixel data that defines images of the eyes. These images may be formed based on ambient light surrounding the user. Thus, in contrast to conventional eye tracking systems that rely on illuminating the eye(s) with near infrared light to cause first Purkinje reflections (e.g., "glints") that are distributed around the iris, the techniques disclosed herein do not require active emission of near infrared light toward the user's eyes. The numerous benefits of the techniques disclosed herein include providing a system that can track the user's eyes using ambient light rather than having to expend battery resources to generate near infrared light. Moreover, the disclosed techniques provide a system that is highly sensitive and accurate in the detection of eye movements (e.g., the systems are sensitive enough to even accurately track saccadic eye movements).

Semi-axes for the "elliptically shaped" iris 108 and/or pupil 106 are uniquely oriented within the sensor plane 302 for any particular subtended angle of the sensor 102 and rotation of the eye being tracked. The size of the semi axes of the elliptically shaped iris 108 and pupil 106 depend on the original size of each and any magnification caused by optical components (e.g., lenses, etc.) of the sensor 102. In FIG. 3, the semi-major axis of the elliptically shaped iris 108 is labelled $p_{ip}^{M}$ and the semi-minor axis of the elliptically shaped iris 108 is labelled $p_{ip}^{m}$. The sensor plane 302 is illustrated with a sensor coordinate system centered thereon. The sensor coordinate system includes a vertical y-Axis and a horizontal x-Axis. Additionally, as illustrated, the elliptically shaped iris 108 is rotated an angle α with respect to the horizontal x-Axis. Therefore, within the sensor plane 302, an ellipse 204 that is centered at $(\bar{x}_{ip}^{d}, \bar{y}_{ip}^{d})$ with semi-major axis $p_{ip}^{M}$ and semi-minor axis $p_{ip}^{m}$ and that is also rotated an angle α with respect to the horizontal x-Axis is given by Equation 1 shown below:

$$E_{ip}(i,j) = \{\bar{x}_{ip}^{d} + p_{ip}^{M} \cos[\varphi(i,j)]\cos(\alpha) - p_{ip}^{m} \sin(\alpha),$$
$$\bar{y}_{ip}^{d} + p_{ip}^{M} \cos[\varphi(i,j)]\sin(\alpha) - p_{ip}^{m} \sin[\varphi(i,j)]$$
$$\cos(\alpha)\} \quad (1)$$

Figure 4:
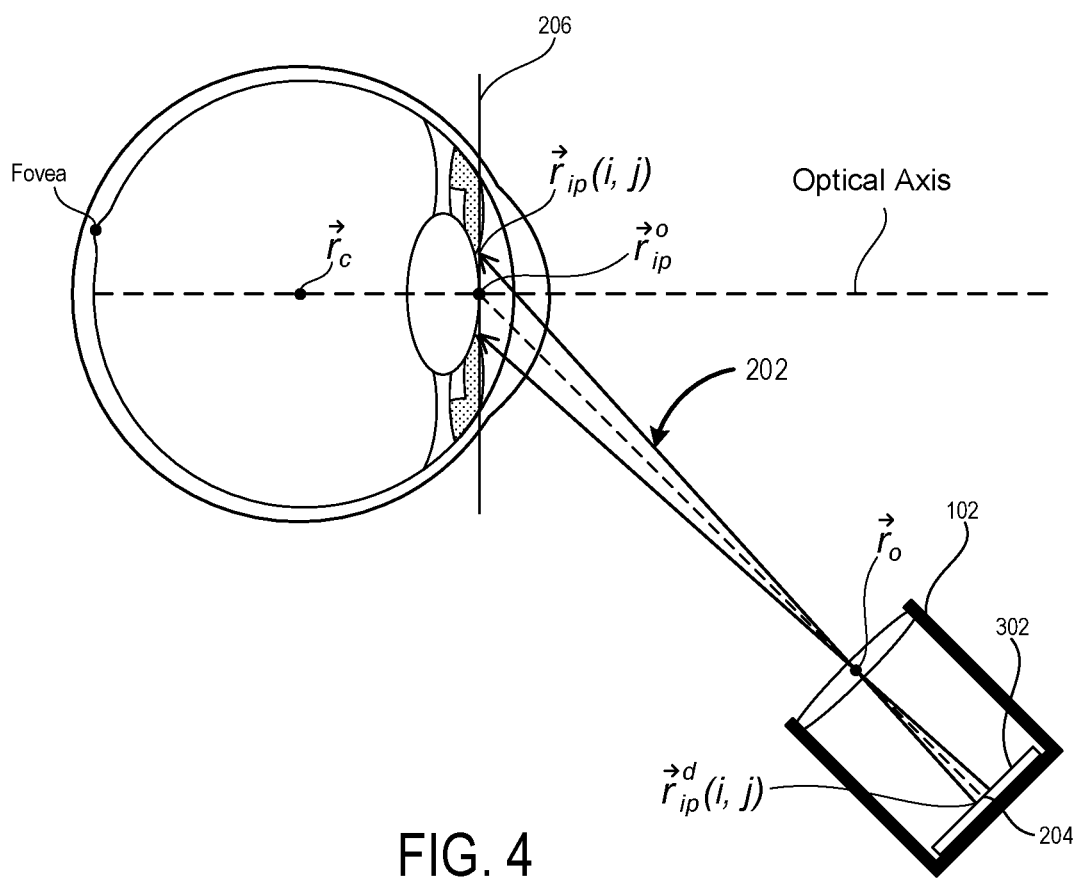
FIG. 4 illustrates a side view of a 3D propagation of the ellipse of FIG. 3 from the sensor plane through a predetermined point and toward the Iris-Pupil plane.

Turning now to FIG. 4, illustrated is a side view of a 3D propagation 202 of the ellipse 204 of FIG. 3 from the sensor plane 302 through a predetermined point. In the illustrated embodiment, the predetermined point is labeled $\vec{r}_o$ and is defined as the center of the entrance pupil for the sensor 102. To improve the clarity of the illustration, only two individual 3D rays of the 3D propagation 202 are shown. Each individual ray extends from a point on the sensor plane 302 that falls along the perimeter of the ellipse 204 through the point $\vec{r}_o$ and, ultimately, to a point on the Iris-Pupil plane 206 that falls along the perimeter of the pupil 106 or iris 108. In plain terms, the 3D propagation 202 represents the reverse of the projections of the pupil 106 or iris 108 through the point $\vec{r}_o$ and to the sensor plane 302. Thus, in three dimensional terms the rays that start from the sensor plane 302 and pass through point $\vec{r}_o$ (e.g., the center of the entrance pupil of the sensor 102) and then travel some additional distance to reach the circular perimeter of the pupil 106 or iris 108 at the Iris-Pupil plane 206 is given by Equation 2 shown below:

$$\vec{r}_{ip}^{d}(i,j) = \vec{r}_o + \left[\sqrt{p_{ip}^2 + d_{ipo}} + \sqrt{|D_{cip}(i,j)|^2 + f^2}\right]\hat{T}_{oip}(i,j) \quad (2)$$

where, $\vec{r}_o$ is a point at which all of the rays of a particular image cross prior to forming an image on the sensor plane 302, $d_{ipo}$ is the distance from the point $\vec{r}_o$ to the center of the iris/pupil $\vec{r}_{ip}^{o}$ (as labeled in FIG. 4), $D_{cip}$ is the radial distance between the center of the sensor 102 and the ellipse points $E_{ip}$, f is the focal length of the sensor 102, and $\hat{T}_{oip}$ (i,j) is the vector going from the points in the ellipse 204 to the point $\vec{r}_o$.

In some embodiments, the systems described herein may determine one or more of an orientation Rot(φ, Θ) of the Iris-Pupil plane 206, a radius $p_{ip}$ of the pupil 106 or iris 108 (e.g., whichever circular feature is being observed to perform eye tracking), and the distance $d_{ipo}$ from the point $\vec{r}_o$ to the center $\vec{r}_{ip}^{o}$ of the iris/pupil by analyzing the 3D propagations 202 with respect to an ocular rotation model. The ocular rotation model may be usable to model rotation of a circular feature of an eye around that eye's center of rotation $\vec{r}_c$. For example, an ocular rotation model may define coordinates of a circle with a center $\vec{r}_{ip}^{o}(i,j)$ and a radius $p_{ip}$ and that is rotated around the eye's center of rotation $\vec{r}_c$ an elevation angle Θ and azimuth angle φ as given by Equation 3 shown below:

$$\vec{r}_{ip}^{r} = Rot(\varphi, \Theta) \cdot (\vec{r}_{ip}^{o} + \vec{r}_{ip}^{c}(i,j) - \vec{r}_c) + \vec{r}_c \quad (3)$$

where the position of the center of the circle is given by $\vec{r}_{ip}^{\,o}=\{\vec{x}_{ip}^{\,o},\vec{y}_{ip}^{\,o},\vec{z}_{ip}^{\,o}\}$, and the parametrized coordinates of the circle are defined as $\vec{r}_{ip}^{\,c}(i,j)=\{p_{ip}\cos\varphi, p_{ip}\sin\varphi, 0\}$. In various embodiments, the center of the iris/pupil circle and the center of rotation of the eye $\vec{r}_c$ are defined from one or more anatomical eye models such as, for example, the Gullstrand model, the Arizona model, the Liou-Brennan model, and/or the Navarro model. Moreover, as described in more detail below, a user-specific calibration may be performed to complete global minimization of the various parameters used in Equation 3 to customize the ocular rotation model to a specific user.

As a specific but non-limiting example, the orientation Rot($\phi$, $\Theta$) of the Iris-Pupil plane 206, the radius $p_{ip}$ of the pupil 106 or iris 108, and the distance $d_{ipo}$ from the point $\vec{r}_o$ to the center $\vec{r}_{ip}^{\,o}$ of the iris/pupil are determined by minimizing the error between the 3D propagations 202 of the points detected (e.g., in the sensor plane 302) $\vec{r}_{ip}^{\,d}$ through the vector $\hat{T}_{cip}(i,j)$, and a circle of radius $p_{ip}$ rotated around the eye center $\vec{r}_c$. An exemplary such error minimization technique is given by Equation 4 shown below:

$$Err(p_{ip}, d_{ipo}, Rot(\phi, \Theta)) = \mathrm{argmin} \sum_{i,j} \left\| \vec{r}_{ip}^{\,d}(i, j) - \vec{r}_{ip}(i, j) \right\|^2 \quad (4)$$

It will be appreciated that upon determining the orientation Rot($\phi$, $\Theta$) of the Iris-Pupil plane 206 and the distance $d_{ipo}$ from the point $\vec{r}_o$ to the center $\vec{r}_{ip}^{\,o}$ of the iris/pupil, the systems disclosed herein can then determine where an optical axis for a tracked eye begins and in which direction it propagates with respect to the sensor 102. Additionally, in embodiments that include two sensors 102 which are separated by a known distance, upon determining the location of the center $\vec{r}_{ip}^{\,o}$ of the pupil for both eyes in relation to the sensors 102, the systems disclosed herein can dynamically determine an interpupillary distance (IPD) for the user (as shown in FIG. 2).

Figure 5A:
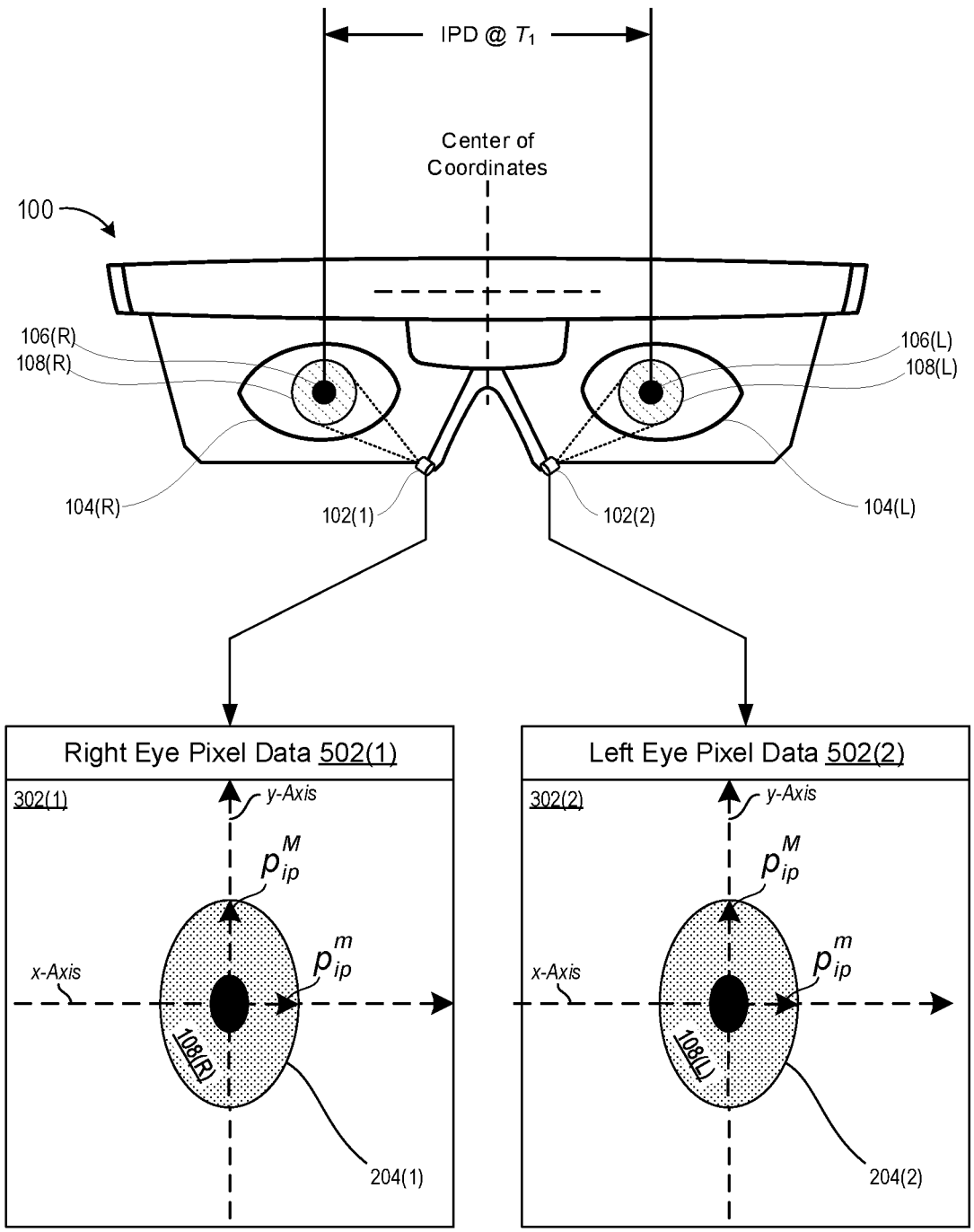
FIG. 5A illustrates exemplary eye tracking data in the form of pixel data that is generated by the sensors and that is usable to implement the techniques described herein.

Turning now to FIG. 5A, exemplary eye tracking data is shown in the form of pixel data 502 that is generated by the sensors 102 and that is usable to implement the techniques described herein. As illustrated in FIG. 5A, a NED device 100 includes a first sensor 102(1) that is angularly offset from and directed toward a user's right eye 104(R) and a second sensor 102(2) that is angularly offset from and directed toward a user's left eye 104(L). As the user's eyes move around to look at and/or track various objects within the user's field-of-view (FOV), the sensors 102 continually capture images of the pupils 106 and/or irises 108 of the user's eyes.

Similar to FIG. 1, FIG. 5A is illustrated from a particular perspective that is directly in front of the user's while the user's is looking straight forward. Thus, the optical axis of each of the eyes 104 is normal to the page and the pupils 106 and irises 108 are illustrated to be perfect circles. Since each of the sensors 102 is angularly offset from the optical axis of the particular eye that it is imaging, the pixel data 502 corresponding to each eye defines the pupils 106 and irises 108 as ellipses. As described above, these ellipses correspond to projections of the pupils 106 and irises 108 onto the corresponding sensor planes 302. Moreover, depending on the optical characteristics of the sensors 102 and/or lenses thereof, these projections may be defined by a series of rays that all pass through a common point such as the center of the entrance pupil of the sensor 102.

As described above, the ellipses that are formed by the projections of the pupils 106 and/or irises 108 onto the corresponding sensor plane 302 have unique orientations and semi-axes for any particular subtended angle of the sensor 102 and rotation of the eye being tracked. As illustrated in FIG. 5A, each of the right eye pixel data 502(1) and the left eye pixel data 502(2) define an image of a correspondingly elliptically shaped iris 108. Each elliptically shaped iris 108 has a semi-major axis that is labelled $p_{ip}^{M}$ and a semi-minor axis that is labelled $p_{ip}^{m}$. The sensor planes 302 are each illustrated with a corresponding sensor coordinate system centered thereon. Each sensor coordinate system includes a vertical y-Axis and a horizontal x-Axis. Additionally, as illustrated, each elliptically shaped iris 108 is aligned with (e.g., centered on and not rotated with respect to) a corresponding sensor coordinate system. Thus, within each of the sensor planes 302(1) and 302(2), the perimeters of the right elliptically shaped iris 108(R) and the left elliptically shaped iris 108(L) define a first ellipse 204(1) and a second ellipse 204(2), respectively. Each of the ellipses 204 are centered at $(\bar{x}_{ip}^{\,d}, \bar{y}_{ip}^{\,d})$ with semi-major axis $p_{ip}^{M}$ and semi-minor axis $p_{ip}^{m}$ and is not rotated respect to the horizontal x-Axis of their corresponding sensor plane 302.

Figure 5B:
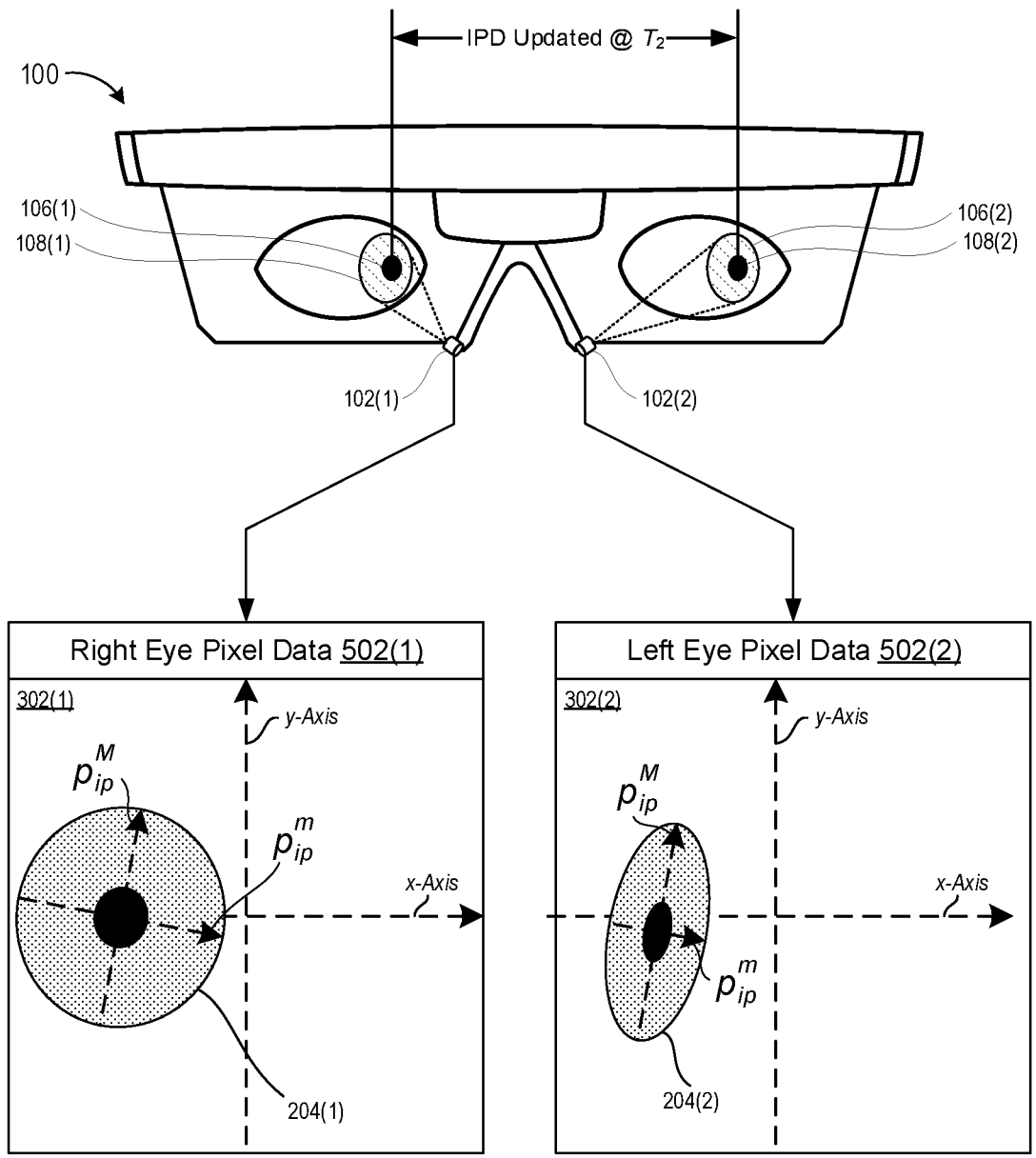
FIG. 5B illustrates exemplary eye tracking data in the form of pixel data that has changed in relation to FIG. 5A due to the user's focus shifting to the left.

Turning now to FIG. 5B, exemplary eye tracking data is shown in the form of pixel data 502 that has changed in relation to FIG. 5A due to the user's focus shifting to the left. As illustrated, the first ellipse 204(1) that corresponds to the projection of the user's right eye 104(R) has shifted and rotated in relation to the first sensor plane 302(1). Additionally, the semi-minor axis $p_{ip}^{m}$ of the first ellipse 204(1) has lengthened since the right eye's optical axis is directed more towards the sensor 102(1) in FIG. 5B (e.g., after the user looks left) that it was in FIG. 5A. As further illustrated, the second ellipse 204(2) that corresponds to the projection of the user's left eye 104(L) has shifted and rotated in relation to the second sensor plane 302(2). Additionally, the semi-minor axis $p_{ip}^{m}$ of the second ellipse 204(2) has shortened since the left eye's optical axis is directed more away from the second sensor 102(2) in FIG. 5B (e.g., after the user looks left) that it was in FIG. 5A.

In various embodiments, the eye tracking data for the user's two eyes may be used to continually and dynamically determine the current (e.g., real time) interpupillary distance (IPD) of the user. In particular, the eye tracking data may be analyzed to determine ellipse parameters that define the ellipses 204 for each eye within the corresponding sensor plane 302. Then, using the techniques described above with respect to equations 1 through 4, the center points $\vec{r}_{ip}^{\,o}$ for each eye may be determined with respect to the corresponding sensor 102. Since the sensors 102 are mechanically fixed at known locations and angles with respect to each other, the determined center points $\vec{r}_{ip}^{\,o}$ for the right eye 104(R) with respect to the first sensor 102(1) and the left eye 104(L) with respect to the second sensor 102(2) together yield the IPD at particular time at which the pixel data was captured. Thus, as shown in FIG. 5A, an IPD can be initially determined in association with pixel data that is captured at a first time $T_1$. Then, as shown in FIG. 5B after the user has looked to the left, an updated IPD can be determined can be determined in association with other pixel data that is captured at a second time $T_2$.

Figure 6:
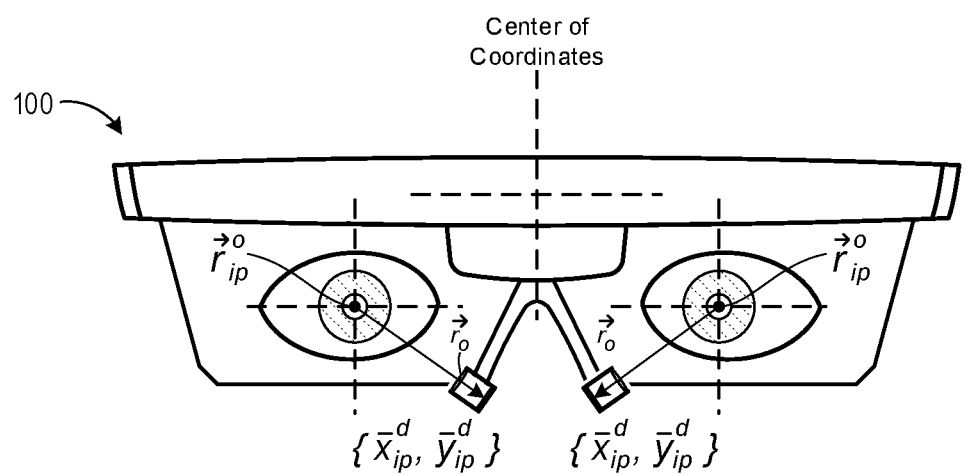
FIG. 6 illustrates exemplary positions of a user's fovea in relation to the optical axes of the user's left and right eyes.

Turning now to FIG. 6, illustrated is the exemplary NED device 100 with various geometrical features labeled thereon that are relevant to a specific technique for calculating the interpupillary distance (IPD). It can be appreciated that Equation 2 as described above can be modified to specifically place the center of the pupil $\vec{r}_{ip}^{\,d}$ (center) in space for both the left and right eyes. Specifically, Equation 2 can be modified into Equation 2.1 as shown below:

$$\vec{r}_{ip}^{\,d}(\text{center}) = \vec{r}_o + \left[d_{ipo} + \sqrt{D_{cip}(\text{center})^2 + f^2}\right]\hat{T}_{oip}(\text{center}) \quad (2.1)$$

Then, once the center of the pupil for each of the right eye 104(R) and the left eye 104(L) have been placed in space, the IPD can be obtained as the norm of the subtraction of the projected pupillary axis for the left eye and the right eye—as given by Equation 5 below:

Interpupilary Distance (IPD)=$\|\vec{r}_{ip}^{\,d}(\text{left,center}) - \vec{r}_{ip}^{\,d}(\text{right,center})\|$ (5)

Figure 7:
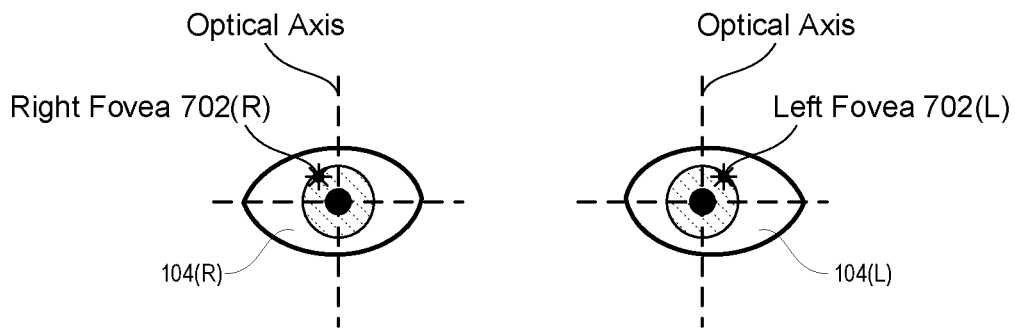
FIG. 7 illustrates exemplary positions of a user's right fovea and left fovea in relation to the optical axes of the user's right eye and left eye, respectively.

Turning now to FIG. 7, illustrated are exemplary positions of a user's right fovea 702(R) and left fovea 702(L) in relation to the optical axes of the user's right eye 104(R) and left eye 104(L), respectively. As can be seen from FIG. 7, the position of the fovea for each eye is eccentric (e.g., not centrally placed) regarding the optical axis of the corresponding eye. Generally speaking, the right fovea 702(R) tends to be positioned in the second quadrant for the right eye 104(R) whereas the left fovea 702(L) tends to be positioned in the first quadrant for the left eye 104(L). This is consistent with the illustrated positions of the fovea in FIG. 7. The fovea 702 is the specific region of the retina at which visual acuity is highest due to the user's retinal cones being particularly concentrated in this area. For this reason, the center of the user's field of vision for each eye is focused at the fovea for that eye. The result is that the user's visual axis passes through the center of the fovea 702 so that light from whatever object the user is currently focused on passes through the pupil and lens of the eye before ultimately striking the fovea 702.

Figure 8:
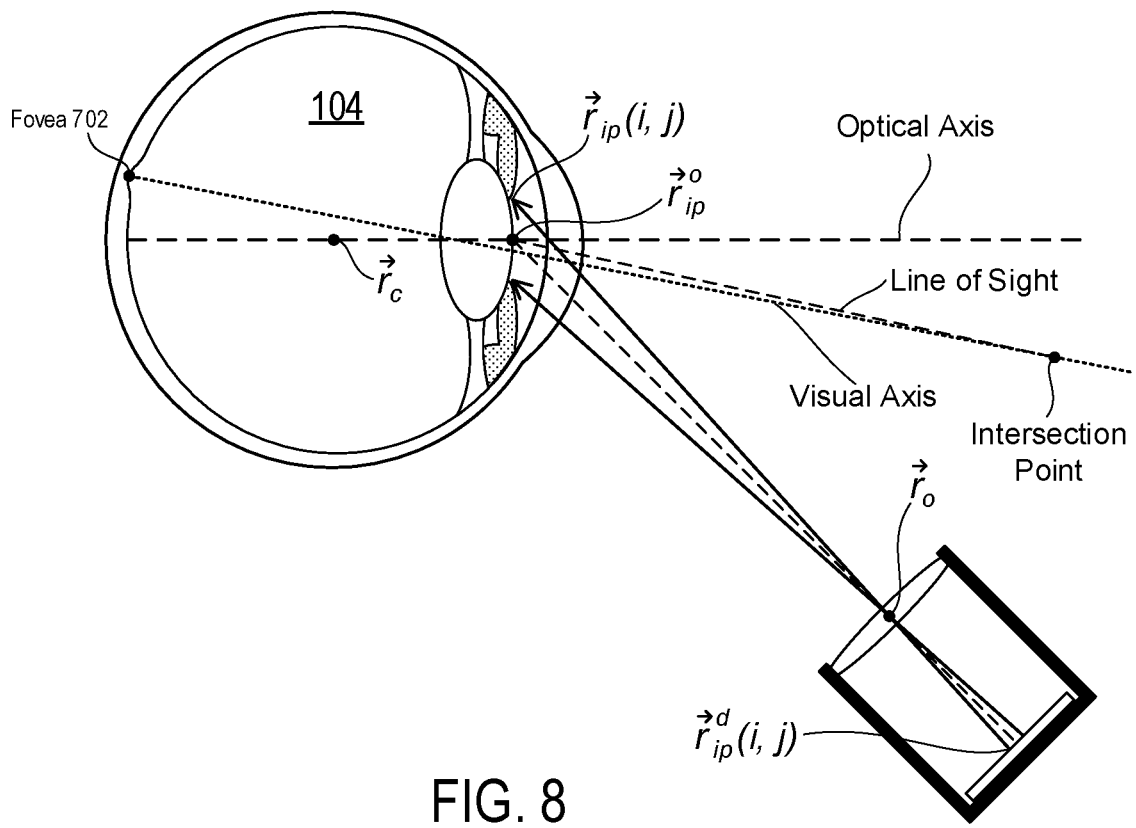
FIG. 8 illustrates a side view of a user's eye showing how the offset position of the user's fovea in relation to the optical axis results in the visual axis diverging from the optical axis.

Turning now to FIG. 8, illustrated is a side view of a user's eye 104 showing how the offset position of the user's fovea in relation to the optical axis results in the visual axis diverging from the optical axis. As illustrated, the fovea position being above the optical axis at the back of the user's eye results in the visual axis pointing down slightly. It should also be appreciated from the combination of FIGS. 7 and 8 that the visual axes of the user's eyes will also tent to be pointed inward slightly.

As shown in FIG. 8, a line of sight of the user extends from the center of the entrance pupil $\vec{r}_{ip}^{\,o}$ and intersects the visual axis at a singular intersection point. Accordingly, when the user is focused on an object at a particular accommodation plane, determining the user's line of sight may be adequate to determine where the user is focused. However, since the visual axis will be most closely directed at whatever object the user is focused on regardless of the depth at which the user is focused, conventional eye tracking methods that merely track the user's line of sight are inadequate for determining where the user is focused for all accommodation planes. By dynamically tracking the user's visual axis, the eye tracking systems disclosed herein are able to determine a vergence in space at which the user is currently focused independent of what accommodation plane that vergence falls on.

In some instances, convention eye tracking systems estimate the user's line of sight by observing the Purkinje reflections with the addition of head tracking information. Unfortunately, even an accurate estimation of the user's line of sight may be insufficient to accurately determine the depth at which the user is focusing within the real-world environment. This is because the user's line of sight and the user's visual axis (which actually propagates to the user's fovea) only converge at a single depth plane. Although the visual axis is illustrated as a straight and continuous line in FIG. 8, it will be appreciated by one skilled in the art that the actual optical path of the visual axis is more aptly described as a line connecting the fixation point (at which the user is focused) to the first and second nodal points (not shown in FIG. 8) and the user's Fovea.

Figure 9:
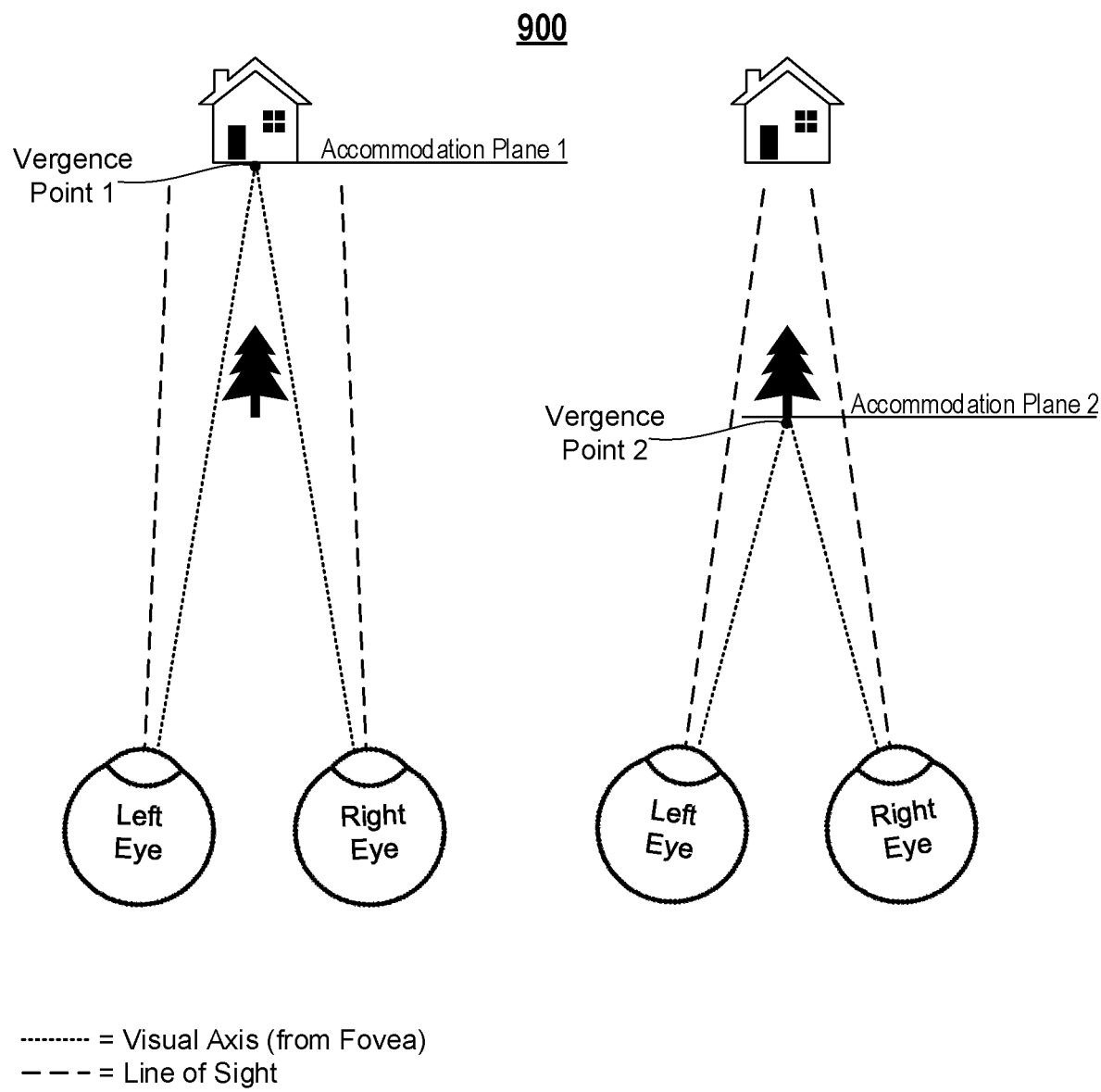
FIG. 9 illustrates an exemplary environment in which a user may perform vergence movements of the eyes to shift a vergence of the two visual axes (e.g., a focal point) from a first accommodation plane to a second accommodation plane.

Turning now to FIG. 9 to demonstrate the foregoing point, illustrated is an exemplary environment 900 in which a user may perform vergence movements of the eyes to shift a vergence of the two visual axes (e.g., a focal point) from a first accommodation plane to a second accommodation plane. It will be appreciated that vergence movements are closely connected to accommodation of the eye. Under normal conditions, changing the focus of the eyes to look at objects at different distances will automatically cause vergence and accommodation. This is sometimes referred to as the accommodation-convergence reflex. Generally speaking, a vergence movement comprises the simultaneous movement of a binocular system (e.g., the user's two eyes) in opposite directions to perform a depth operation. When the user performs a vergence movement to change a focus from a distant object to a relatively closer object, the eyes rotate toward each other (i.e., the eyes perform a convergence movement). When the user performs a vergence movement to change a focus from a close object to a relatively more distant object, the eyes rotate toward away from each other (i.e., the eyes perform a divergence movement).

The left side of FIG. 9 shows the focus of the user on a house at "Accommodation Plane 1" that is relatively farther from the user than "Accommodation Plane 2." Thus, on the right side of FIG. 9 the visual axes each reach a common vergence point that resides on the house whereas a vergence of the lines of sight (which conventional systems track) does not actually represent where the user is focused. The left side of FIG. 9 shows the focus of the user on a tree that is at an Accommodation Plane 2 that is relatively closer to the user. Thus, on the left side of FIG. 9 the visual axes each reach a common vergence point that resides on the tree whereas a vergence of the lines of sight again does not actually represent where the user is focused.

In some embodiments, visual axis offset data is used to continuously track the visual axis of the user's eyes 104. For example, it can be appreciated that by deploying various techniques as described above, the eye tracking systems described herein may continually determine the optical axis and the orientation Rot(ϕ, Θ) of the Iris-Pupil plane 206. Exemplary visual axis offset data defines a spatial relationship between the optical axis of the eye and/or the orientation Rot(ϕ, Θ) of the Iris-Pupil plane 206 of the eye 104. Thus, upon determining the optical axis and/or the orientation Rot(ϕ, Θ) for a particular eye, the eye tracking systems described herein may utilize the visual axis offset data to calculate the visual axis.

Figure 10:
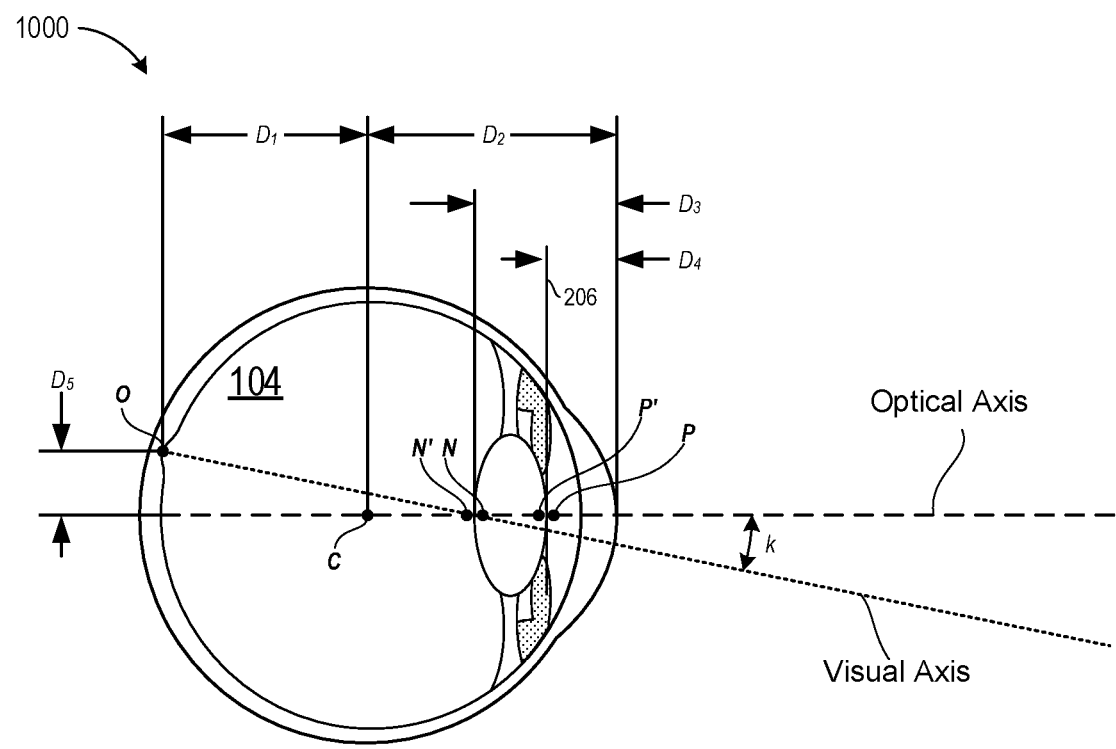
FIG. 10 illustrates an exemplary anatomical eye model that defines geometrical relationships between various portions of an eye.

Turning now to FIG. 10 to demonstrate the foregoing point, illustrated is an exemplary anatomical eye model 1000 that defines geometrical relationships between various portions of an eye 104. As illustrated, the anatomical eye model 1000 defines: a horizontal dimension $D_1$ from the center of the eye 104 (i.e., the point labeled "C") to the fovea (i.e., the point labeled "O"); a horizontal dimension $D_2$ from the center of the eye 104 (i.e., the point labeled "C") to the front surface of the cornea; a horizontal dimension $D_3$ from the front surface of the cornea to a rear surface of the lens of the eye 104 (i.e., the point labeled "N'"); a horizontal dimension $D_4$ from the front surface of the cornea to a front surface of the lens of the eye 104 (i.e., the point labeled "P'"); and a vertical dimension $D_5$ from the center of the eye 104 (i.e., the point labeled "C") to the fovea (i.e., the point labeled "O"). In various implementations, these or other dimensions may be used to define the visual axis offset data. The values for the relevant dimensions may be taken from any variety of suitable models that include, but are not limited to, the Gullstrand model, the Arizona model, the Liou-Brennan model, and/or the Navarro model.

As illustrated in FIG. 10, the visual angle $\vec{VA}_{N'}$ line may be represented as a vector that extends from the fovea at point "O" to the point labeled "N'" that represents the rear surface of the lens of the eye 104. The visual angle $\vec{VA}_{N'}$ line subtends an angle k from the optical axis and can be defined based on Equation 6 below:

$$\vec{VA}_{N'} = \frac{\vec{r}_{N'} - \vec{r}_O}{|\vec{r}_{N'} - \vec{r}_O|} = \frac{\vec{R}_{N'O}}{|\vec{R}_{N'O}|} \quad (6)$$

where $\vec{r}_{N'}$ is the image nodal position and $\vec{r}_o$ is the central position of the fovea 702. In general, literature has reported that the angle k ranges between 4 and 8 degrees.

It can be appreciated that by applying the definition of nodal points to the exemplary anatomical eye model 1000, there is a conservation of the angles regarding the optical axis. For this reason, the line that starts from the object nodal point "N" can be described by Equation 7 given below:

$$\vec{VA}_N = \vec{r}_N + D_{SN} \vec{VA}_{N'} \quad (7)$$

where $\vec{r}_N$ is the object nodal point and $D_{SN}$ is the distance between object nodal point "N" and the stimulus (e.g., object) upon which the user is focused.

Based on the foregoing, it can be appreciated that the rotation calculated from the minimization technique described in relation to Equation 4 as applied over $\vec{VA}_N$ regarding to the center $\vec{r}_C$ of the eye 104 must be equal to the vector joining the stimulus and the target as given by Equation 8 below:

$$Rot(\phi,\Theta)(\vec{R}_{SC} + \|\vec{R}_{SN}\| \vec{VA}_{N'}) = \vec{R}_{SC} \quad (8)$$

It can be appreciated that the various nodal points that are illustrated in FIG. 10 and described throughout this document will change in relative position as the user focuses on object at different accommodation planes. For example, in focusing on objects at different depths, the lenses of the eyes are of course caused to change shape. As these shape changes occur the rear surface of the lens may shift between the nodal point labeled "N" and the nodal point labeled "N'" whereas the front surface of the lens may shift between the nodal point labeled "P" and the nodal point labeled "P'." Notable, these changes in the shape of the lens and positions of the nodal points that are triggered by accommodation changes have an insignificant impact on the orientation and placement of the visual axis within the eye. For this reason, in various embodiments the visual axis offset data may define relationships between the optical axis of the eye in a manner that is independent of the current accommodation plane upon which the user is focused.

Figure 11:
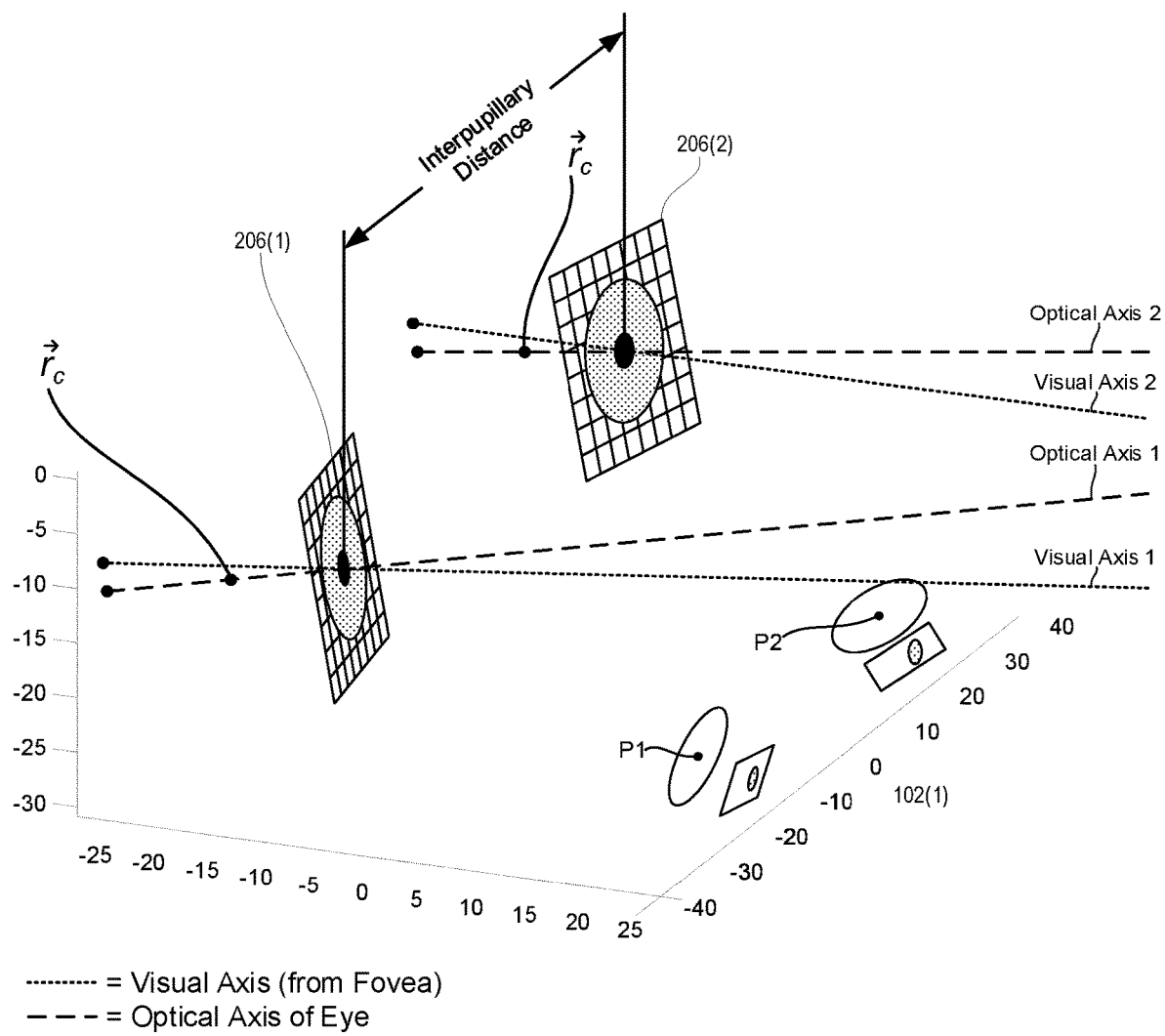
FIG. 11 illustrates a pair of visual axes that are determinable based on visual axis offset data defining a spatial relationship between the individual visual axes and corresponding optical axes.

To illustrate the foregoing, FIG. 11 illustrates a pair of visual axes that are determinable based on visual axis offset data defining a spatial relationship between the individual visual axes and corresponding optical axes. As illustrated in FIG. 10, upon determining the optical axis and the orientation Rot($\phi$, $\Theta$) of the Iris-Pupil plane 206 for each eye 104, the eye tracking systems described herein can then calculate the visual axes for each eye. These calculations may be done continuously based on visual axis offset data that defines a spatial relationship between the optical axis of the eye and/or the orientation Rot($\phi$, $\Theta$) of the Iris-Pupil plane 206 of the eye 104.

In some embodiments, upon calculating the pair of visual axes for a particular moment in time, the eye tracking system may then determine the vergence of the visual axes in space. The two visual axes will rarely actually converge in space perfectly. This is because although generally modeled as such, the human body does not behave perfectly symmetrically. Rather, there are slight variations in where the two eyes will actually be pointed in a real-life scenario. As such, in various embodiments, the vergence is calculated by performing minimization techniques with respect to both of the two visual axes. Stated plainly, based on the assumption that the two visual axes will be closest to actually converging at or very near the point in space that the user is actually focusing, the techniques described herein may determine the vergence point to be the point in space at which the visual axes are closest together.

Figure 12:
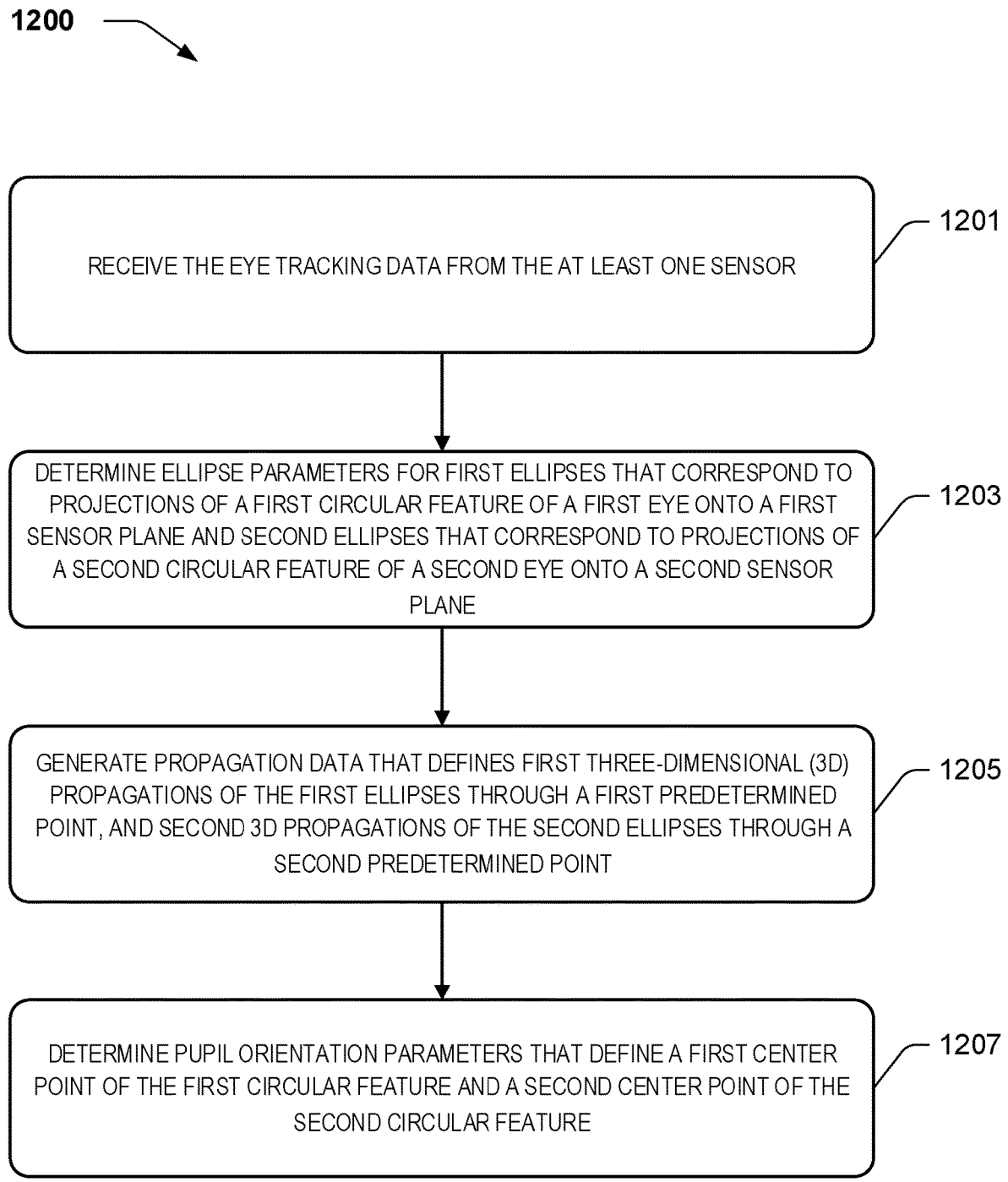
FIG. 12 is a flow diagram of a process to generate propagation data that defines three-dimensional (3D) propagations from ellipses detected at a sensor plane to determine pupil orientation parameters.

Turning now to FIG. 12, a flow diagram is illustrated of a process 1200 to generate propagation data that defines three-dimensional (3D) propagations from ellipses detected at a sensor plane to determine pupil orientation parameters. The process 1200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 1201, an eye tracking system receives eye tracking data from at least one sensor that is directed toward at least one eye. As described herein, the at least one sensor can be a camera that includes at least one lens through which light passes prior to striking an image sensor (e.g., a CMOS sensor or any other suitable type of image sensor). The eye tracking data may be in the form of pixel data that defines an image of circular feature(s) of the at least one eye. In an exemplary embodiment, the eye tracking data includes images of both a right eye and a left eye of a user of a NED device. Moreover, as described above, the images may include elliptical representations of the circular features of the eyes due to a sensor plane in each of the sensors being angularly offset from an Iris-Pupil plane of the respective eye that each sensor is tracking. In various implementations, the eye tracking system may select between tracking the pupil vs the iris depending on physical characteristics of the user. For example, if the user has very dark irises, there may be very little contrast between the user's pupils and the user's irises. The result of this lack of contrast may be that tracking the user's pupil is impractical. In such a case, the eye tracking system may use the user's iris to perform the eye tracking since there will be greater contrast between the user's iris and the sclera (commonly referred to as the "white of the eye") of the user's eyes than between the user's "dark" iris and the user's dark pupil.

At block 1203, the eye tracking system may determine ellipse parameters for first ellipses that correspond to projections of a circular feature of a first eye (e.g., a right eye) onto a first sensor plane and also for second ellipses that correspond to projections of a circular feature of a second eye (e.g., a left eye) onto a second sensor plane. For example, the system may determine, for each of the first ellipse and the second ellipse, a center-point for the ellipse, a semi-major axis of the ellipse, a semi-minor axis of the ellipse, and an angular rotation of the ellipse with respect to a sensor plane.

At block 1205, the eye tracking system may generate propagation data that defines first 3D propagations of the first ellipse back toward the first eye and second 3D propagations of the second ellipse back toward the second eye. In various embodiments, each of the 3D propagations may comprise a series of lines that all begin at a point along the perimeter of an ellipse that is detected on a sensor plane and then propagation through a predetermined point back toward the eye of a user. It should be appreciated that the 3D propagations described herein may be generally understood as mathematical representations of rays of light rather than actual projections of light that are emitted from the eye tracking system toward the user. Notable, a major benefit of the eye tracking systems and techniques disclosed herein is that light need not be emitted for implementations—rather the eye tracking data can be generated based exclusively on ambient light.

At block 1207, the eye tracking system may utilize the propagation data to determine pupil orientation parameters that define various characteristics of the user's eye(s). Exemplary pupil orientation parameters may define optical axes for one or both of the user's eyes (e.g., an axis of an eye lens), visual axes for one or both of the user's eyes (e.g. axes that extend from the fovea through the lens and into the real-world environment), rotational angles of the user's eyes (e.g. an angle of rotation between a semi-axis of an ellipse and a horizontal axes of the sensor), Iris-Pupil Planes of the user's eyes (e.g. a plane on which the pupil resides), center points for the user's eyes (e.g., a point at which the optical axis (or alternatively the visual axis) intersects the Iris-Pupil plane). Additionally, or alternatively, the pupil orientation parameters may define various other characteristics of the user's eyes.

Figure 13:
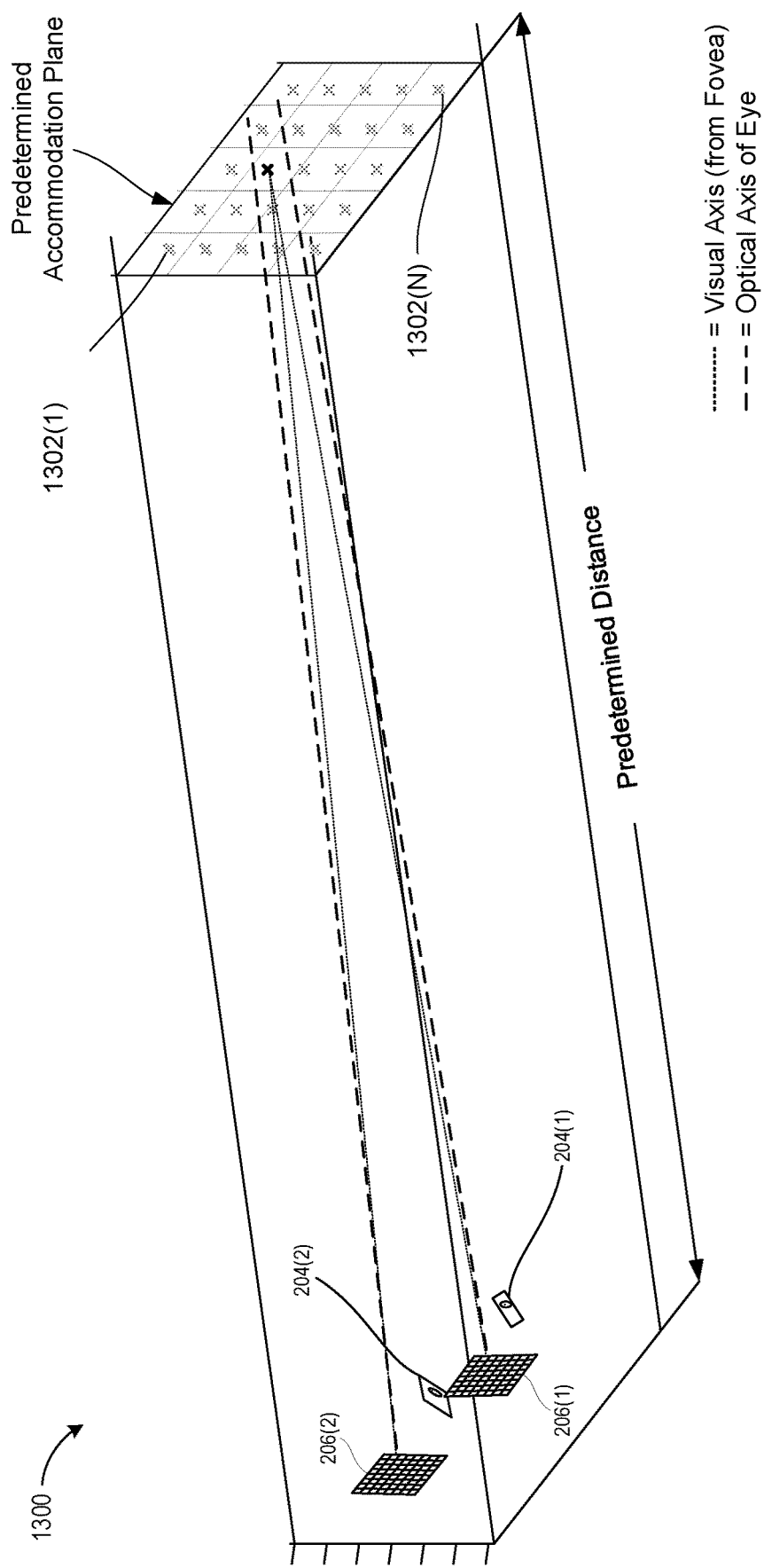
FIG. 13 illustrates an exemplary environment in which a plurality of virtual stimuli can be sequentially generated at a predetermined accommodation plane to facilitate a user-specific calibration of an eye tracking system.

Turning now to FIG. 13, illustrated is an exemplary environment 1300 in which a plurality of virtual stimuli 1302 can be sequentially generated at a predetermined accommodation plane to facilitate a user-specific calibration of an eye tracking system. As illustrated, the plurality of virtual stimuli 1302 may be uniformly spaced in a predetermined grid shaped pattern at the predetermined accommodation plane. In implementations in which a NED device eye tracking system is being calibrated, the predetermined accommodation plane may be spaced a predetermined distance in front of the NED device 100 (not shown in FIG. 13). As a specific but non-limiting example, the predetermined accommodation plane may be spaced a distance of two meters in front of the user. It should be appreciated that because the stimuli are virtual in nature (i.e., they are generated by the NED device and do not exist in the real world environment), the virtual stimuli may be generated at the accommodation plane of two meters by a display element 101 (e.g. a waveguide display) that is located at a much closer distance to the user's eyes than two meters. For example, modern NED devices are capable of rendering images at a plurality of accommodation depths all from a transparent display that is positioned between fifteen and thirty-five millimeters from the user's eyes.

In order to facilitate the user-specific calibration process, a NED device may sequentially render individual ones of the virtual stimuli 1302. In some implementations, only a single virtual stimulus may be presented at any given moment whereas in other implementations multiple different stimuli may be concurrently rendered. By causing an individual virtual stimulus to appear and then disappear, the NED device may affectively attract a user's gaze direction (e.g., the user's visual focus) onto specific known locations. While presenting individual ones of the virtual stimuli to attract the user's gaze direction, the NED device simultaneously captures instances of eye tracking data such as, for example, images of the eyes taken via a CMOS sensor. The eye tracking data may be indicative of one or more center points for elliptical images 204 of the user's pupils and/or irises— each center point uniquely corresponding to an individual virtual stimulus. As described in detail below, these center points may be used to define and/or form a polygon grid by interconnecting the center points (or averages for clusters/groupings thereof) as they are represented within the sensor planes 204 of each sensor. Furthermore, the resulting polygon grids may be usable to interpolate a user's eye gaze in near real-time when the NED device is being used in real-time operation (e.g., following the calibration process). In a specific implementation, the polygon grid is a grid of triangles from which a user's gaze may be calculated using a Delaunay decomposition and by estimating barycentric coordinates.

Figure 14:
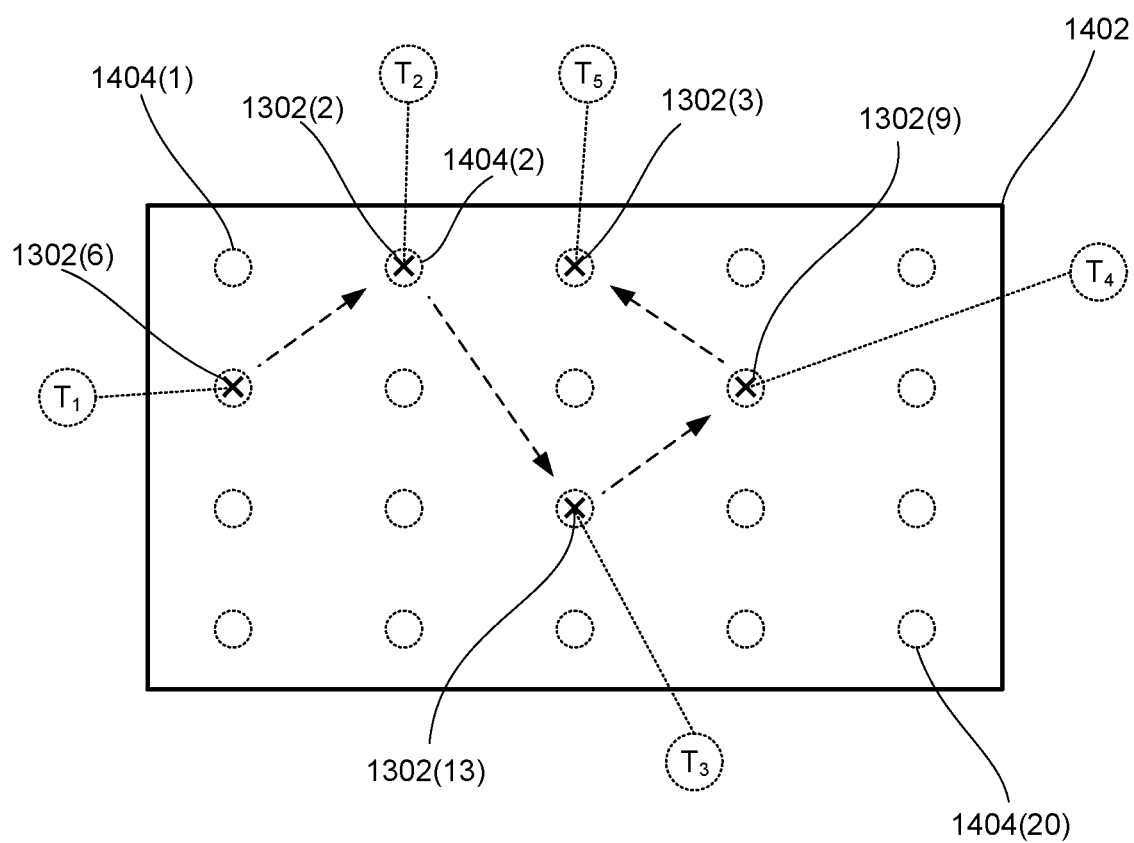
FIG. 14 illustrates an exemplary sequence of individual virtual stimuli being generated at a predetermined accommodation plane at predetermined locations.

Turning now to FIG. 14, illustrated is an exemplary sequence of individual virtual stimuli being generated at a predetermined accommodation plane 1402 at predetermined locations 1404. In the illustrated example, there are twenty predetermined locations 1404 at which individual virtual stimuli 1302 may be rendered—although any other suitable number may used as a matter of design. For purposes of FIG. 14, a first virtual stimulus (not shown) can at some moments in time be rendered at the first predetermined location 1404(1), a second virtual stimulus 1302(2) can at some moments in time be rendered at the second predetermined location 1404(2), and so on. Also, for purposes of the present discussion, the numbering of the predetermined locations progresses sequentially from left-to-right and then from top-to-bottom. Thus, the first predetermined location 1404(1) is labeled at the upper left of the predetermined accommodation plane 1402 and the twentieth predetermined location 1404(20) is labeled at the bottom right of the predetermined accommodation plane 1402.

With regard to the exemplary sequence illustrated in FIG. 14, at a first time $T_1$, a sixth virtual stimulus 1302(6) is presented to a user at a sixth predetermined location of the predetermined accommodation plane 1402. As described above, while the sixth virtual stimulus 1302(6) is being rendered, the eye tracking system simultaneously captures one or more instances of eye tracking data and associates these instances with the sixth virtual stimulus 1302(6). In some implementations, the eye tracking system captures numerous instances of eye tracking data while rendering the sixth virtual stimulus 1302(6) to account for saccadic movements of the user's eyes while the user is focusing on the sixth virtual stimulus 1302(6). To illustrate, suppose that the user's eyes make about three saccadic movements per second as the user focuses on any particular stimulus. Under these circumstances, the sixth virtual stimulus 1302(6) may be rendered for a period of five seconds and the eye tracking system may capture at least one instance of eye tracking data in association with each individual saccadic movement—resulting in at least 15 discrete instances of eye tracking data associated with the sixth virtual stimulus 1302(6). Then, these multiple discrete instances may be used to calculate average or nominal values for various aspects of the eye tracking data such as, for example, calibration ellipse centers.

Then, at a second time $T_2$, a second virtual stimulus 1302(2) is rendered at a second predetermined location 1404(2) of the predetermined accommodation plane 1402. Just as was previously described in relation to time $T_1$, while the second virtual stimulus 1302(2) is being rendered the eye tracking system is capturing one or more instances of eye tracking data in association with the second virtual stimulus 1302(2). As illustrated in FIG. 14, the exemplary sequence may continue until an adequate amount of eye tracking data has been captured in association with an adequate number of the virtual stimuli 1302. For example, at a third time $T_3$ a $13^{th}$ virtual stimulus 1302(13) is rendered while additional instances of eye tracking data are captured. Then, at a fourth time $T_4$, a ninth virtual stimulus 1302(9) while additional instances of eye tracking data are captured, and so on.

In various implementations the order in which the individual virtual stimuli are presented may be random in nature. For example, a probability function may be used to sequentially determine which virtual stimuli to present next to the user. Furthermore, in various implementations, individual virtual stimuli 1302 may be repeatedly presented to the user until the instances of eye tracking data captured in association with the individual virtual stimuli exhibit a predetermined level of consistency. For example, the first virtual stimuli 1302(1) may be presented to the user over and over again until a standard deviation of the measured ellipse center points in the instances of eye tracking data associated with the first virtual stimuli 1302(1) reach a threshold level.

Figure 15A:
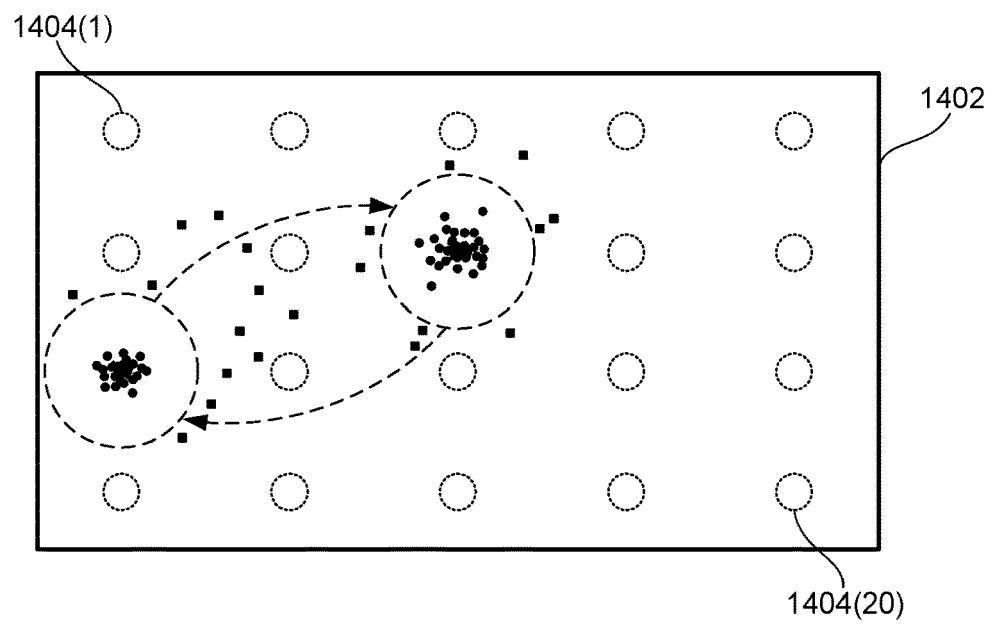
FIG. 15A illustrates an exemplary aggregation of focal points for which instances of eye tracking data are captured in association with individual ones of the virtual stimuli.

Turning now to FIG. 15A, illustrated is an exemplary aggregation of "user" focal points for which instances of eye tracking data are captured in association with individual ones of the virtual stimuli 1302. That it, FIG. 15A shows aggregations of where the user has focused his or her visual gaze direction during some portion of the calibration process. As described above, even as an individual virtual stimulus is presented, the user's focal direction will not remain static or fixed at a point on that individual virtual stimulus. Rather, the user's focus will move rapidly around this individual virtual stimulus due to saccadic movements which naturally occur as the user collects information about the scene. To illustrate these concepts, presume that the NED device that is undergoing calibration is sequentially switching between presenting an eleventh virtual stimuli 1302(11) and an eight virtual stimulus 1302(8)—as shown in FIG. 15A. Further presume that these virtual stimuli are being rendered one at a time while the NED device captures multiple instances of eye tracking data—each instance (e.g., image) being uniquely associated with the eleventh virtual stimuli 1302(11) or the eight virtual stimulus 1302(8). Specifically, an individual instance of eye tracking data may be captured in association with each individual focal point shown in FIG. 15A—all while the user's focus is toggling between these individual focal points.

Figure 15B:
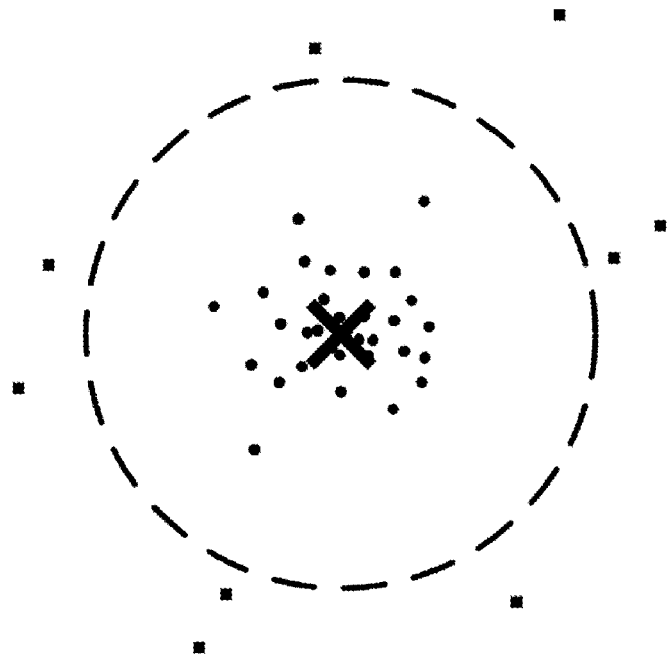
FIG. 15B illustrates an enlarged view of the aggregation of focal points that surrounds a particular virtual stimulus shown in FIG. 15A.

Turning now to FIG. 15B, illustrated is an enlarged view of the aggregation of focal points that surrounds the eight virtual stimulus 1302(8) shown in FIG. 15A. In FIGS. 15A and 15B, there are multiple ones of both targeted focal points and wondering focal points. As shown in the key at the bottom of FIG. 15B, the targeted focal points are represented in FIGS. 15A and 15B as circular dots whereas the wondering focal points are represented as square dots. For purposes of the present discussion, the targeted focal points represent points at which the user's eye(s) focus while the user is actively gathering information about a specific virtual stimulus. For example, as shown in FIG. 15B, the targeted focal points are shown to be tightly clustered around the eight virtual stimulus 1302(8) due to saccadic eye movements that naturally occur while the user is gathering information about the eight virtual stimulus 1302(8). In contrast to the targeted focal points, the wondering focal points represent points at which the user's eye(s) focus when the user loses mental focus with respect to user-specific calibration process. As the wondering focal points may be considered "noise" which is not useful (and may be detrimental) to accurately performing the user-specific calibration, in various implementations these wondering focal points may be identified and discarded.

In some implementations, the individual focal points may be designated as "targeted" or "wondering" based on their proximity to a currently displayed virtual stimulus. For example, as shown in FIGS. 15A and 15B, each of the focal points that fall within a threshold distance from the eleventh virtual stimuli 1302(11) or the eight virtual stimulus 1302(8) are designated as "targeted" focal points and, therefore, are represented as circular dots. In contrast, each of the focal points that fall outside of the threshold distance from the eleventh virtual stimuli 1302(11) or the eight virtual stimulus 1302(8) are designated as "wondering" focal points and, therefore, are represented as square dots. It should be appreciated that the threshold distance is illustrated around each of the eleventh virtual stimuli 1302(11) and the eight virtual stimulus 1302(8) by a circular dashed line.

Figure 16:
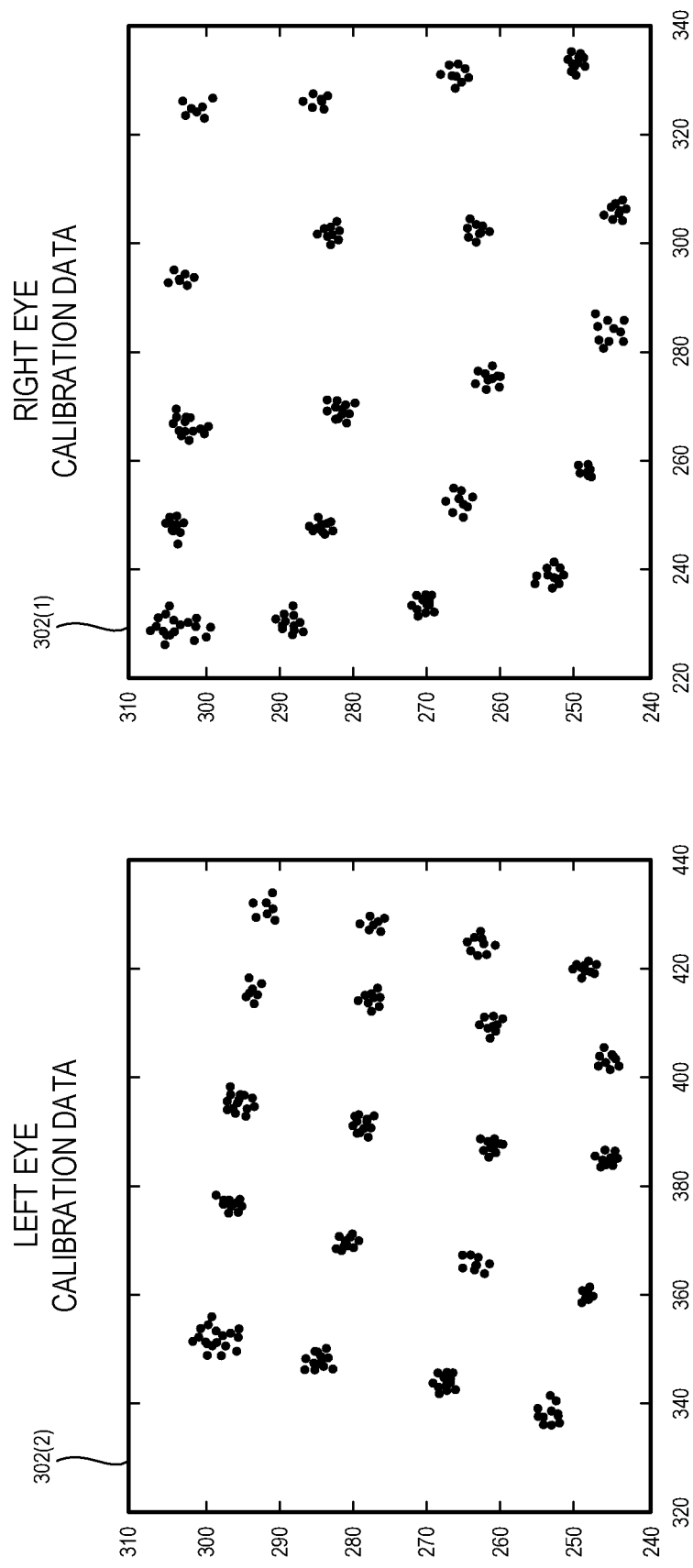
FIG. 16 illustrates exemplary aggregations of numerous instances of eye tracking data that are captured in association with targeted focal points.

Turning now to FIG. 16, illustrated are exemplary aggregations of numerous instances of eye tracking data that are captured in association with targeted focal points. That is, the aggregations include instances of eye tracking data (e.g., images of the eyes) that are captured while the user is focusing on individual ones of the virtual simuli. Each of the instances of eye tracking data (e.g., each circular dot shown in FIG. 16) may represent a center point of a pupil or iris within an image of an eye. For example, in implementations in which each instance of eye tracking data corresponds to an image showing an elliptical representation of the pupil or iris, each circular dot shown in FIG. 16 represents a center point for an ellipse 204 that is represented in an individual instance (e.g., frame, sample, etc.) of eye tracking data.

As illustrated in FIG. 16, the eye tracking data is represented within sensor planes 302 that individually correspond to each of the user's left eye and right eye. Thus, the aggregations constitute left eye calibration data that is represented in association with a second sensor plane 302(2) that corresponds to the user's left eye as described in FIG. 3, and the aggregations further constitute right eye calibration data that is represented in association with a first sensor plane 302(1) that corresponds to the user's right eye as described in FIG. 3. It should be appreciated that since the eye tracking data is represented within the sensor planes 302, the plurality of virtual stimuli in relation to which the eye tracking data is captured are not shown in FIG. 16 since those are rendered in the accommodation plane. Stated plainly, instances of eye tracking data shown in FIG. 16 represent what the sensors 102 "see" when the user is looking at the various virtual stimuli in the accommodation plane. It should further be appreciated that within each of the right eye calibration data and the left eye calibration data, the targeted focal points are tightly grouped in association with individual ones of the virtual stimuli. For example, within each of the right eye calibration data and the left eye calibration data, an upper left most set of targeted focal points are tightly grouped together and each correspond to the first virtual stimulus 1302(1) (i.e., the instances are captured while the user is focused on the first virtual stimulus 1302(1)). Also, within each of the right eye calibration data and the left eye calibration data the remaining 19 groupings of targeted focal points each individually or respond to one of the second virtual stimulus 1302(2) through the $20^{th}$ virtual stimulus 1302(20).

Figure 17:
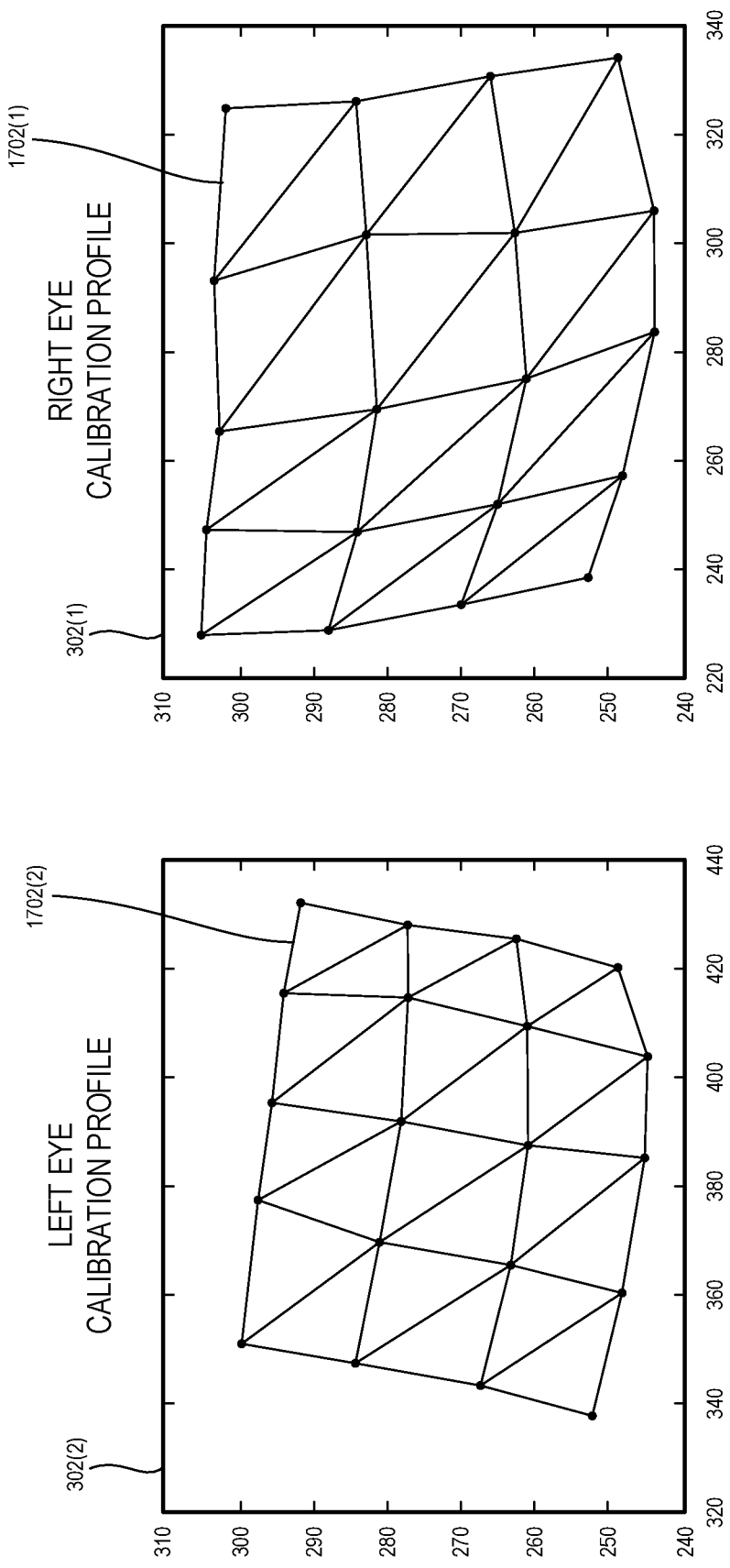
FIG. 17 illustrates exemplary calibration profiles that define polygon grids that are formed by interconnecting instances of the eye tracking data shown in FIG. 17 within a corresponding sensor plane.

Turning now to FIG. 17, illustrated are exemplary calibration profiles that define polygon grids 1702 that are formed by interconnecting average center points for instances of the eye tracking data shown in FIG. 17 within a corresponding sensor plane 302. In the specifically illustrated example, the polygon grids 1702 include a first grid of triangles 1702(1) that is generated based on the right eye calibration data and also a second grid of triangles 1702(2) that is generated based on the left eye calibration data. As described above, the polygon grids 1702 may be formed by interconnecting averaged values of numerous calibration ellipse centers that uniquely correspond to individual ones of the plurality of virtual stimuli. As used herein, the term "calibration ellipse center" refers to an ellipse center that is captured during the user-specific calibration process while the user is prompted to sequentially focus on different virtual stimuli. As further described above, using the averaged values of the calibration ellipse centers for any one virtual stimuli may improve the accuracy of the calibration techniques described herein since this averaging accounts for (e.g., smooths out) the observed saccadic movements. Thus, multiple instances (e.g., frames) of eye tracking data may be collected in association with each individual virtual stimulus—each instance of eye tracking data having a different ellipse center. For example, twelve unique instances of eye tracking data may be collected in association with an individual virtual stimulus. These twelve unique instances of eye tracking data may be averaged to determine an average or nominal calibration ellipse center in association with the individual virtual stimulus. Then, this average or nominal calibration ellipse center may be used to form a polygon grid that is specific to the user. Of course, this averaging may be similarly performed with respect to each individual virtual stimulus, e.g., twenty in the illustrated implementation.

As shown in FIG. 17, these average or nominal calibration ellipse centers may be interconnected to form the polygon grids 1702 that are specific to an individual user. In the specifically illustrated but nonlimiting example, the average or nominal calibration ellipse centers that are determinable from the clusters or groupings of data shown in FIG. 16 are interconnect in FIG. 17 to form grids of triangles that are represented in the sensor plane. The resulting polygon grid may then be used during operation to interpolate the real-time gaze direction of the user.

Figure 18:
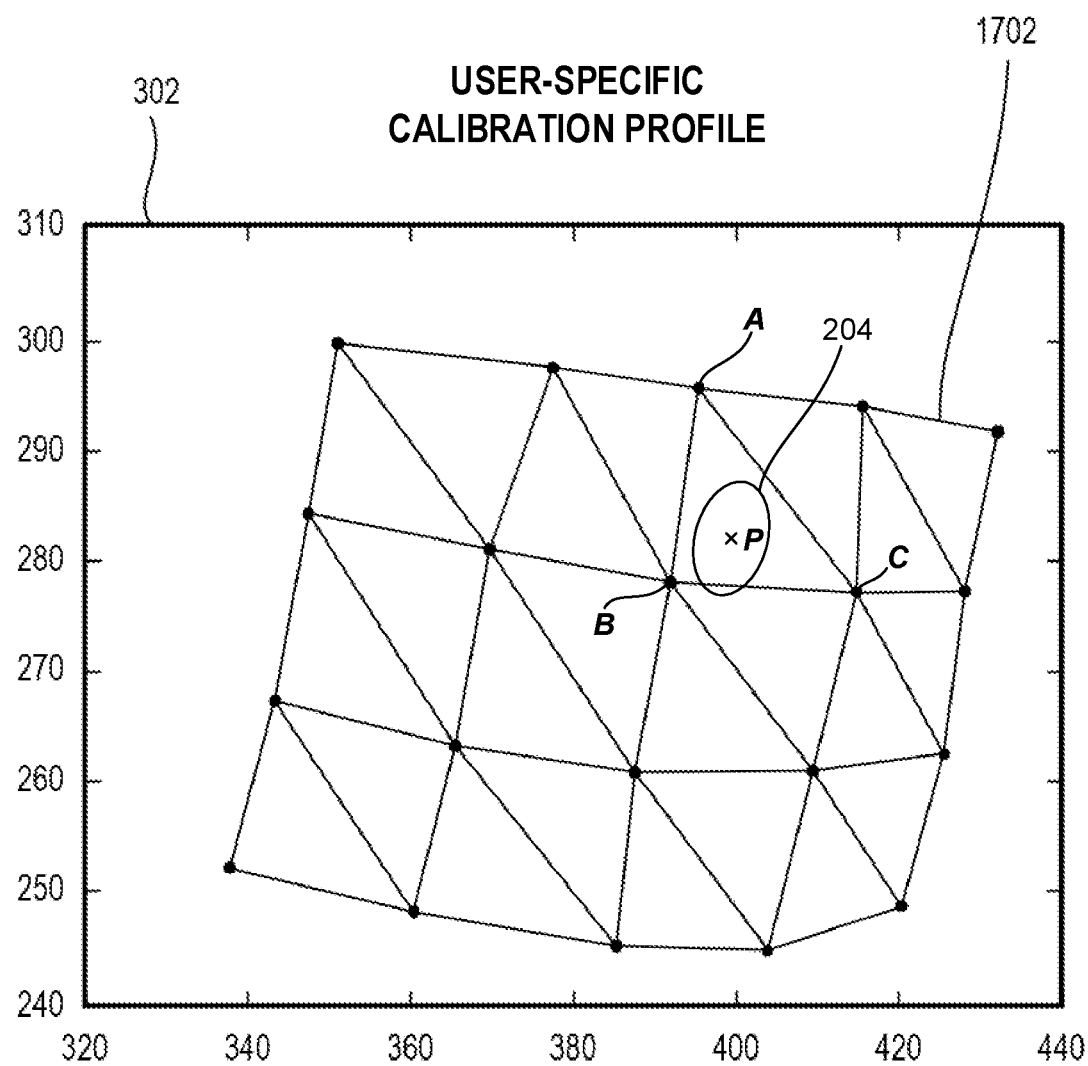
FIG. 18 illustrates a schematic diagram of how a "real-time" ellipse center ("P") may fall within a polygon grid during real-time operation and may be used to interpolate the real-time gaze direction of the user.

Turning now to FIG. 18, illustrated is a schematic diagram of how a "real-time" ellipse center ("P") may fall within a polygon grid 1702 while the NED device monitors movements of the user's eyes during real-time operation and may be used to interpolate the real-time gaze direction of the user. Similar to the eye tracking data that is captured during calibration, the eye tracking data that is captured during real-time operation may be indicative of one or more center points ("P") for elliptical images (204) of the user's pupils and/or irises. However, these so called "real-time" ellipse centers will in most cases be located somewhere in between groupings of the "calibration" ellipse centers. This is of course because the user is no longer being presented with virtual stimuli but is rather focusing at various objects of interest that exist within a real-world environment. Thus, the "real-time" ellipse centers that are identified when eye tracking is being performed during actual use of the NED device (e.g., following the calibration phase when virtual stimulus are presented) are located within the boundaries of individual polygons of the user-specific polygon grid. For example, a "real-time" ellipse center might fall within an individual triangle that is formed by interconnecting a group of three "calibration" ellipse centers. As used herein, the term "real-time ellipse center" refers to an ellipse center that is captured during when the NED device is performing eye tracking in real-time while the user is using the NED device in normal use cases (e.g., non-calibration purposes).

To determine the user's real time gaze direction (e.g., in terms of optical axis and/or visual axis), the NED device may determine which particular polygon of the polygon grid a current "real-time" ellipse center falls within. For example, if the polygon grid is a grid of triangles, then a real-time instance of eye tracking data (e.g., a particular frame or image of an eye) may be analyzed to determine which particular triangle a real-time ellipse center currently falls within. With respect to this point, consider that triangles from the Delaunay decomposition of the triangle $\overrightarrow{ABC}$ within which the point P is bound may be represented by Equation 9 below:

$$P = A + u\overrightarrow{AB} + v\overrightarrow{AC} \quad (9)$$

where the point P belongs to (e.g., is bound within) the triangle particular $\overrightarrow{ABC}$ when: $0 \leq u \leq 1$; $0 \leq v \leq 1$; and $0 \leq u + v \leq 1$.

Once the triangle to which the real-time ellipse center belongs has been determined, the Euclidean distance between the "real-time" ellipse center to each of the calibration ellipse centers that form the triangle may be determined. That is, in the illustrated example, the distance between the point P and each of the points {A, B, C} may then be calculated. Proportionality factors $\alpha_R$ may then be calculated with respect to each of the calibration ellipse centers that form the polygon grid bounding the real-time ellipse center. For example, in the example where the polygon grid is a grid of triangles, then three proportionality factors ($\alpha_A$, $\alpha_B$, and $\alpha_C$) may calculated based on the real-time ellipse center. In some implementations, the proportionality factors $\alpha_R$ are determined as the sum of the calculated distances divided by the distance of interest as represented by Equation 10 below:

$$\alpha_R = \frac{\|\overrightarrow{PA}\| + \|\overrightarrow{PB}\| + \|\overrightarrow{PC}\|}{\|\overrightarrow{PR}\|} \quad (10)$$

where R={A, B, C}.

Then, the calculated proportionality factors may then be used as weighted sums to calculate the user's real time gaze direction in terms of the user's gaze direction $\hat{N}_p$ (e.g., in terms of Optical Axis and/or Visual Axis). In some exemplary implementations, the user's gaze direction $\hat{N}_p$ may be calculated based on Equation 11 below:

$$\hat{N}_p \frac{\alpha_A \hat{N}_A + \alpha_B \hat{N}_B + \alpha_C \hat{N}_C}{\|\alpha_A \hat{N}_A + \alpha_B \hat{N}_B + \alpha_C \hat{N}_C\|} \quad (11)$$

Based on the foregoing calculations, the user's IPD can be directly calculated using the techniques described above in relation to FIG. 6.

Figure 19:
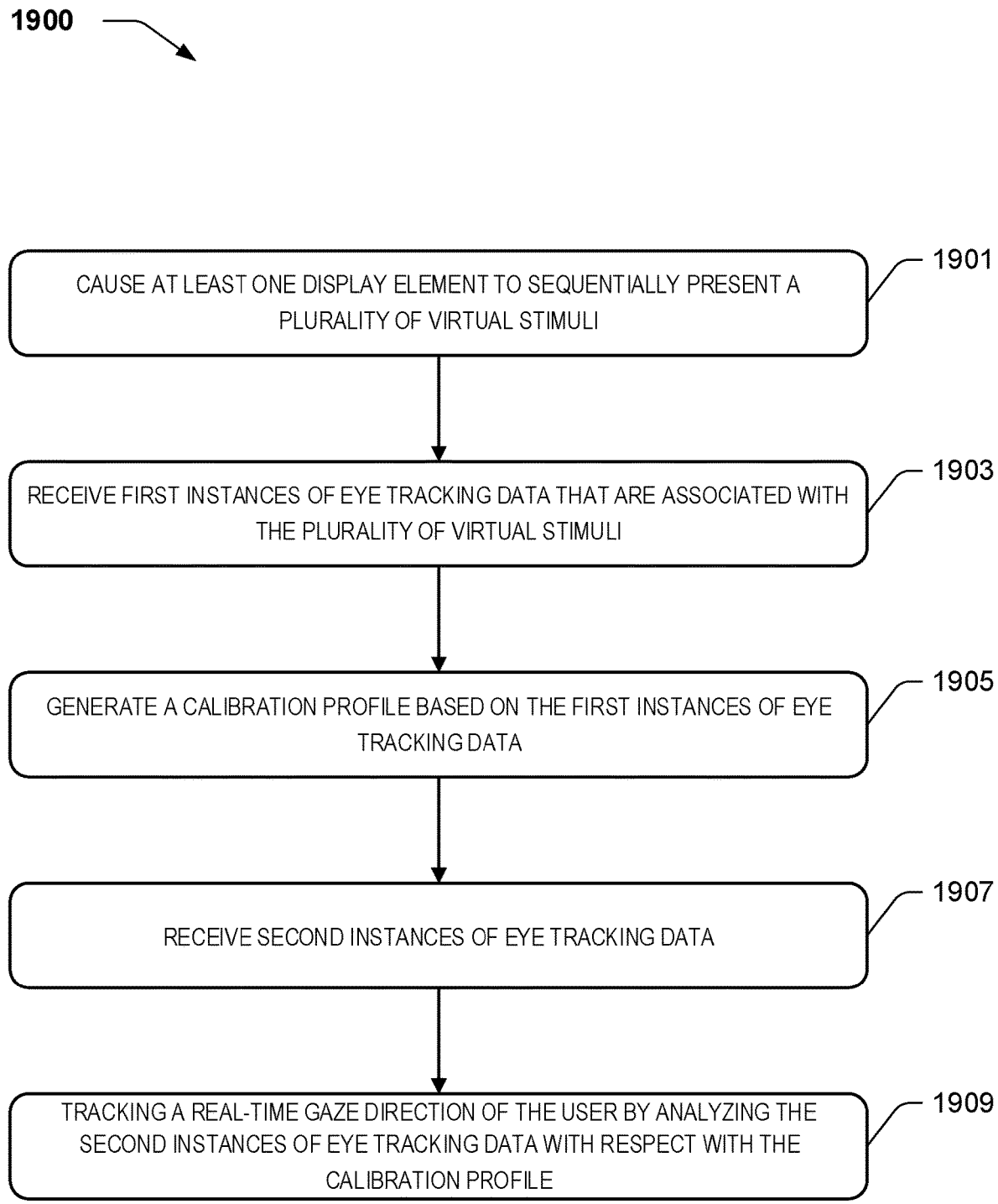
FIG. 19 is a flow diagram of a process to generate a calibration profile for a user based on instances of eye tracking data that are received in association with virtual stimuli and to use the calibration profile to track a real-time gaze of the user.

FIG. 19 is a flow diagram of a process 1900 to generate a calibration profile for a user based on instances of eye tracking data that are received in association with virtual stimuli and to use the calibration profile to track a real-time gaze of the user.

At block 1901, a system such as, for example, the NED device 100 may cause at least one display element to sequentially present a plurality of virtual stimuli. The plurality of virtual stimuli may be individually presented in a random or pseudo-random fashion.

At block 1903, the system may receive a plurality of first instances of eye tracking data from at least one sensor. As described in detail above, individual instances of the plurality of first instances of eye tracking data may be generated while individual virtual stimuli of the plurality of virtual stimuli are being presented to a user. The first instances of eye tracking data may be aggregated together to form calibration data in association with one or both eye of the user.

At block 1905, the system may generate a calibration profile that defines at least one polygon grid formed by interconnections between the plurality of first instances of eye tracking data. In some embodiments, the at least one polygon grid includes a first polygon grid that is represented in a first sensor plane that corresponds to a first eye of the user and also a second polygon grid that is represented in a second sensor plane that corresponds to a second eye of the user.

At block 1907, the system may receive, from the at least one sensor, a plurality of second instances of eye tracking data. The second instances may be received during real-time operation of the system—following generation of the calibration profile. For example, the second instances may be received while a user is wearing a NED device during real time operation.

At block 1909, the system may track a real-time gaze direction of the user by analyzing the plurality of second instances of eye tracking data with respect with the calibration profile. For example, as described in relation to FIG. 18, the system may determine where a "real-time" ellipse center ("P") falls within a polygon grid of the calibration profile to interpolate the real-time gaze direction of the user.

EXAMPLE CLAUSES

Example Clause A, a Near-Eye-Display (NED) system, comprising: at least one display element configured to render computer generated images within a field of view of a user; at least one sensor configured to generate eye tracking data associated with at least one eye of the user; a controller that is communicatively coupled to the at least one display element and the at least one sensor, wherein the controller is configured to perform a user-specific calibration protocol and a user-specific eye tracking protocol; the user-specific calibration protocol including operations of: causing the at least one display element to sequentially present a plurality of virtual stimuli; receiving a plurality of first instances of the eye tracking data from the at least one sensor, wherein individual instances of the plurality of first instances correspond to individual virtual stimuli of the plurality of virtual stimuli; and generating a calibration profile that defines at least one polygon grid formed by interconnections between the plurality of first instances; and the user-specific eye tracking protocol including operations of: receiving a plurality of second instances of the eye tracking data from the at least one sensor; and determining real-time gaze directions of the user based on locations of aspects of the plurality of second instances with respect with the at least one polygon grid.

Example Clause B, the NED system of Example Clause A, wherein the at least one polygon grid is formed by interconnecting average values for a plurality of groupings of calibration ellipse centers, and wherein individual groupings of calibration ellipse centers correspond to the individual virtual stimuli of the plurality of virtual stimuli.

Example Clause C, the NED system of any one of Example Clauses A through B, wherein the determining the real-time gaze directions of the user includes determining distances between the aspects of the plurality of second instances to vertices of at least one individual polygon of the at least one polygon grid.

Example Clause D, the NED system of any one of Example Clauses A through C, wherein the determining the real-time gaze directions of the user further includes determining proportionality factors of at least one real-time ellipse center, of the plurality of second instances of the eye tracking data, with respect to a plurality of calibration ellipse centers of the plurality of first instances of the eye tracking data.

Example Clause E, the NED system of any one of Example Clauses A through D, wherein the plurality of virtual stimuli are presented to the user at a predetermined accommodation plane that is forward from the at least one display element.

Example Clause F, the NED system of any one of Example Clauses A through E, wherein the individual virtual stimuli are repeatedly presented to the user at least until a standard deviation of a plurality of calibration ellipse centers reaches a threshold level.

Example Clause G, the NED system of any one of Example Clauses A through F, wherein the at least one polygon grid includes at least one grid of triangles.

Example Clause H, the NED system of any one of Example Clauses A through G, wherein the at least one polygon grid includes: a first polygon grid that is represented in a first sensor plane that corresponds to a first eye of the user; and a second polygon grid that is represented in a second sensor plane that corresponds to a second eye of the user.

Example Clause I, a computer-implemented method, comprising: causing at least one display element to present a plurality of virtual stimuli to a user in accordance with a predetermined arrangement; receiving, from at least one sensor, first instances of eye tracking data, wherein individual instances of the first instances are generated while individual virtual stimuli of the plurality of virtual stimuli are being presented to the user; generating a calibration profile that defines at least one polygon grid formed based on interconnections between average values of a plurality of groupings of the individual instances, wherein individual groupings of the plurality of groupings correspond to individual virtual stimuli; subsequent to the generating the calibration profile, receiving second instances of the eye tracking data from the at least one sensor; and determining real-time gaze directions of the user by analyzing the second instances of the eye tracking data with respect with the at least one polygon grid.

Example Clause J, the computer-implemented method of Example Clause I, wherein the average values of the plurality of groupings of the individual instances correspond to average calibration ellipse centers of the plurality of groupings.

Example Clause K, the computer-implemented method of any one of Example Clauses I through J, further comprising: determining distances between real-time ellipse centers, which are indicated by the second instances of the eye tracking data, to vertices of at least one individual polygon of the at least one polygon grid; and determining proportionality factors of the real-time ellipse centers based on the distances, wherein the determining the real-time gaze directions of the user is based at least in part on the proportionality factors of the real-time ellipse centers.

Example Clause L, the computer-implemented method of any one of Example Clauses I through K, further comprising: determining a particular polygon of the at least one polygon grid that a real-time pupil center is bound within; and determining distances between the real-time pupil center and vertices of the particular polygon of the at least one polygon grid.

Example Clause M, the computer-implemented method of any one of Example Clauses I through L, wherein the determining the real-time gaze directions is based at least in part on proportionality factors of at least one real-time pupil center with respect to a plurality of calibration pupil centers.

Example Clause N, the computer-implemented method of any one of Example Clauses I through M, wherein the plurality of virtual stimuli are presented to the user at a predetermined accommodation plane that is forward from the at least one display element.

Example Clause O, the computer-implemented method of any one of Example Clauses I through N, wherein the at least one polygon grid includes: a first grid of triangles that is represented in a first sensor plane, and a second grid of triangles that is represented in a second sensor plane.

Example Clause P, an eye tracking system, comprising: at least one processor; and at least one memory in communication with the at least one processor, the at least one memory having computer-readable instructions stored thereupon that, when executed by the at least one processor, cause the at least one processor to: cause at least one display element to sequentially present a plurality of virtual stimuli; receive, from at least one sensor, a plurality of first instances of eye tracking data, individual instances of the plurality of first instances of eye tracking data being generated while individual virtual stimuli of the plurality of virtual stimuli are being presented to a user; generate a calibration profile that defines at least one polygon grid formed by interconnections between the plurality of first instances of eye tracking data; receive, from the at least one sensor, a plurality of second instances of eye tracking data; and track a real-time gaze direction of the user by analyzing the plurality of second instances of eye tracking data with respect with the calibration profile that defines the at least one polygon grid formed by interconnections between the plurality of first instances of eye tracking data.

Example Clause Q, the eye tracking system of Example Clause P, wherein the at least one polygon grid is formed by interconnections between average calibration ellipse centers that correspond to individual virtual stimuli.

Example Clause R, the eye tracking system of any one of Example Clauses P through Q, wherein the real-time gaze direction of the user is determined based at least in part on distances between a real-time pupil center and vertices of a particular polygon of the at least one polygon grid.

Example Clause S, the eye tracking system of any one of Example Clauses P through R, wherein individual instances of the plurality of first instances correspond to individual virtual stimuli of the plurality of virtual stimuli.

Example Clause T, the eye tracking system of any one of Example Clauses P through S, wherein the at least one polygon grid includes: a first grid of triangles that is represented in a first sensor plane, and a second grid of triangles that is represented in a second sensor plane.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A Near-Eye-Display (NED) system, comprising:
at least one display element configured to render computer generated images within a field of view of a user;
at least one sensor configured to generate eye tracking data associated with at least one eye of the user;
a controller that is communicatively coupled to the at least one display element and the at least one sensor, wherein the controller is configured to perform a user-specific calibration protocol and a user-specific eye tracking protocol;
the user-specific calibration protocol including operations of:
  causing the at least one display element to sequentially render a plurality of virtual stimuli at a plurality of different locations within the field of view, wherein individual virtual stimuli are rendered at individual locations of the plurality of different locations;
  receiving a plurality of first instances of the eye tracking data from the at least one sensor, wherein individual first instances of the plurality of first instances correspond to the individual virtual stimuli of the plurality of virtual stimuli; and
  generating a calibration profile that defines at least one polygon grid formed by interconnections between the plurality of first instances that correspond to the plurality of virtual stimuli that are rendered at the plurality of different locations within the field of view; and
the user-specific eye tracking protocol including operations of:
  receiving a plurality of second instances of the eye tracking data from the at least one sensor; and
  interpolating locations of aspects of the plurality of second instances with respect with the at least one polygon grid to determine real-time gaze directions of the user.

2. The NED system of claim 1, wherein the at least one polygon grid is formed by interconnecting average values for a plurality of groupings of calibration ellipse centers, and wherein individual groupings of calibration ellipse centers correspond to the individual virtual stimuli of the plurality of virtual stimuli.

3. The NED system of claim 1, wherein the interpolating includes determining distances between the aspects of the plurality of second instances to vertices of at least one individual polygon of the at least one polygon grid.

4. The NED system of claim 3, wherein determining the real-time gaze directions of the user further includes determining proportionality factors of at least one real-time ellipse center, of the plurality of second instances of the eye tracking data, with respect to a plurality of calibration ellipse centers of the plurality of first instances of the eye tracking data.

5. The NED system of claim 1, wherein the plurality of virtual stimuli are presented to the user at a predetermined accommodation plane that is forward from the at least one display element.

6. The NED system of claim 1, wherein the individual virtual stimuli are repeatedly presented to the user at least until a standard deviation of a plurality of calibration ellipse centers reaches a threshold level.

7. The NED system of claim 1, wherein the at least one polygon grid includes at least one grid of triangles.

8. The NED system of claim 1, wherein the at least one polygon grid includes:
a first polygon grid that is represented in a first sensor plane that corresponds to a first eye of the user; and
a second polygon grid that is represented in a second sensor plane that corresponds to a second eye of the user.

9. A computer-implemented method, comprising:
causing at least one display element to sequentially present a plurality of virtual stimuli to a user at a plurality of different locations within a first of view of the user;
receiving, from at least one sensor, first instances of eye tracking data, wherein individual instances of the first instances are generated while individual virtual stimuli of the plurality of virtual stimuli are being presented to the user at individual locations of the plurality of different locations;
generating a calibration profile that defines at least one polygon grid formed based on interconnections between average values of a plurality of groupings of the individual instances, wherein individual groupings of the plurality of groupings correspond to individual virtual stimuli;
subsequent to the generating the calibration profile, receiving second instances of the eye tracking data from the at least one sensor; and
determining real-time gaze directions of the user by interpolating the second instances of the eye tracking data with respect with the at least one polygon grid.

10. The computer-implemented method of claim 9, wherein the average values of the plurality of groupings of the individual instances correspond to average calibration ellipse centers of the plurality of groupings.

11. The computer-implemented method of claim 9, further comprising:
determining distances between real-time ellipse centers, which are indicated by the second instances of the eye tracking data, to vertices of at least one individual polygon of the at least one polygon grid; and
determining proportionality factors of the real-time ellipse centers based on the distances, wherein the determining the real-time gaze directions of the user is based at least in part on the proportionality factors of the real-time ellipse centers.

12. The computer-implemented method of claim 9, further comprising:
determining a particular polygon of the at least one polygon grid that a real-time pupil center is bound within; and
determining distances between the real-time pupil center and vertices of the particular polygon of the at least one polygon grid.

13. The computer-implemented method of claim 9, wherein the determining the real-time gaze directions is based at least in part on proportionality factors of at least one real-time pupil center with respect to a plurality of calibration pupil centers.

14. The computer-implemented method of claim 9, wherein the plurality of virtual stimuli are presented to the user at a predetermined accommodation plane that is forward from the at least one display element.

15. The computer-implemented method of claim 9, wherein the at least one polygon grid includes: a first grid of triangles that is represented in a first sensor plane, and a second grid of triangles that is represented in a second sensor plane.

16. An eye tracking system, comprising:
at least one processor; and
at least one memory in communication with the at least one processor, the at least one memory having computer-readable instructions stored thereupon that, when executed by the at least one processor, cause the at least one processor to:
cause at least one display element to sequentially present a plurality of virtual stimuli at a plurality of different locations within a field of view;
receive, from at least one sensor, a plurality of first instances of eye tracking data, individual first instances of the plurality of first instances of eye tracking data being generated while individual virtual stimuli, of the plurality of virtual stimuli, are being presented to a user at individual locations of the plurality of different locations;
generate a calibration profile that defines at least one polygon grid formed by interconnections between the plurality of first instances of eye tracking data;
receive, from the at least one sensor, a plurality of second instances of eye tracking data; and
track a real-time gaze direction of the user by interpolating the plurality of second instances of eye tracking data with respect with the calibration profile that defines the at least one polygon grid formed by interconnections between the plurality of first instances of eye tracking data.

17. The eye tracking system of claim 16, wherein the at least one polygon grid is formed by interconnections between average calibration ellipse centers that correspond to individual virtual stimuli.

18. The eye tracking system of claim 16, wherein the real-time gaze direction of the user is determined based at least in part on distances between a real-time pupil center and vertices of a particular polygon of the at least one polygon grid.

19. The eye tracking system of claim 16, wherein individual instances of the plurality of first instances correspond to individual virtual stimuli of the plurality of virtual stimuli.

20. The eye tracking system of claim 16, wherein the at least one polygon grid includes: a first grid of triangles that is represented in a first sensor plane, and a second grid of triangles that is represented in a second sensor plane.

* * * * *

UNITED STATES PATENT AND TRADEMARK OFFICE
CERTIFICATE OF CORRECTION

Page 1 of 1

PATENT NO.         : 10,852,823 B2
APPLICATION NO.    : 16/414654
DATED              : December 1, 2020
INVENTOR(S)        : Sergio Ortiz Egea et al.

It is certified that error appears in the above-identified patent and that said Letters Patent is hereby corrected as shown below:

On the Title Page

Item (72) Line 2, Inventors Section please delete:
"(Redmond, WA)" from Gao; Jian Feng And insert:
--(Cupertino, CA)--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*